(12) United States Patent
Ito et al.

(10) Patent No.: US 9,587,566 B2
(45) Date of Patent: Mar. 7, 2017

(54) AIR INTAKE APPARATUS FOR INTERNAL COMBUSTION ENGINE

(71) Applicant: AISIN SEIKI KABUSHIKI KAISHA, Kariya-shi, Aichi-ken (JP)

(72) Inventors: Atsushi Ito, Anjo (JP); Keitaro Mori, Anjo (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 70 days.

(21) Appl. No.: 14/652,898

(22) PCT Filed: Dec. 16, 2013

(86) PCT No.: PCT/JP2013/083574
§ 371 (c)(1),
(2) Date: Jun. 17, 2015

(87) PCT Pub. No.: WO2014/098010
PCT Pub. Date: Jun. 26, 2014

(65) Prior Publication Data
US 2015/0322867 A1    Nov. 12, 2015

(30) Foreign Application Priority Data

Dec. 18, 2012 (JP) ................................ 2012-275918
Jul. 18, 2013 (JP) ................................ 2013-149691

(51) Int. Cl.
*F02M 35/10* (2006.01)
*F02D 9/10* (2006.01)
*F02M 29/06* (2006.01)

(52) U.S. Cl.
CPC ............. *F02D 9/104* (2013.01); *F02M 26/19* (2016.02); *F02M 29/06* (2013.01); *F02M 35/10262* (2013.01); *Y02T 10/146* (2013.01)

(58) Field of Classification Search
CPC ........ F02D 9/104; F02M 26/19; F02M 29/06; F02M 35/10262; Y02T 10/146
(Continued)

(56) References Cited

U.S. PATENT DOCUMENTS 6,138,651 A    10/2000  Mori et al.
6,425,382 B1 *  7/2002  Marthaler .............. F02M 26/19
                                                    123/568.17
(Continued)

FOREIGN PATENT DOCUMENTS

JP    54-81021 U     6/1979
JP    H02-35951 U    3/1990
(Continued)

OTHER PUBLICATIONS

Office Action issued on May 10, 2016, by the Japanese Patent Office is corresponding Japanese Patent Application No. 2014-553121 and partial English translation of the Office Action. (9 pages).
(Continued)

Primary Examiner — Hung Q Nguyen
(74) Attorney, Agent, or Firm — Buchanan Ingersoll & Rooney PC

(57) ABSTRACT

This air intake apparatus for an internal combustion engine includes a throttle-side air intake pipe having one end connected to a throttle and another end connected to a surge tank, an external gas inlet provided in at least one of the throttle-side air intake pipe and the surge tank, introducing external gas into at least one of the throttle-side air intake pipe and the surge tank, and a gas distributivity improvement fin provided inside at least one of the throttle-side air intake pipe and the surge tank, which corresponds to the external gas inlet, diffusing the external gas to intake air from the throttle.

13 Claims, 12 Drawing Sheets

(58) Field of Classification Search
USPC .................................................. 123/568.17
See application file for complete search history.

(56) References Cited

U.S. PATENT DOCUMENTS

| | | | |
|---|---|---|---|
| 8,549,850 B2* | 10/2013 | Janakiraman | F01N 3/05 60/219 |
| 2005/0247361 A1* | 11/2005 | Canova | F02M 35/10013 138/37 |
| 2007/0169764 A1* | 7/2007 | Lo | F02M 29/06 123/592 |
| 2008/0178831 A1 | 7/2008 | Enokida | |
| 2010/0288228 A1 | 11/2010 | Puschnik et al. | |
| 2013/0255616 A1* | 10/2013 | Yao | F02M 35/104 123/184.21 |

FOREIGN PATENT DOCUMENTS

| | | |
|---|---|---|
| JP | 11-210564 A | 8/1999 |
| JP | 2000-008967 A | 1/2000 |
| JP | 2000-130276 A | 5/2000 |
| JP | 2004-270538 A | 9/2004 |
| JP | 2008-184939 A | 8/2008 |
| JP | 2010-144669 A | 7/2010 |
| JP | 2011-501024 A | 1/2011 |
| JP | 2012-193631 A | 10/2012 |

OTHER PUBLICATIONS

International Search Report (PCT/ISA/210) mailed on Mar. 11, 2014, by the Japanese Patent Office as the International Searching Authority for International Application No. PCT/JP2013/083574.
Written Opinion (PCT/ISA/237) mailed on Mar. 11, 2014, by the Japanese Patent Office as the International Searching Authority for International Application No. PCT/JP2013/083574.

* cited by examiner

FIRST EMBODIMENT

FIRST EMBODIMENT
II-II CROSS-SECTION

FIRST EMBODIMENT

FIRST EMBODIMENT

FIRST EMBODIMENT

FIRST EMBODIMENT

FIRST EMBODIMENT

FIRST EMBODIMENT

SECOND EMBODIMENT
(DURING MANUFACTURING)

SECOND EMBODIMENT
(STATE AFTER MOUNTING)

SECOND EMBODIMENT

THIRD EMBODIMENT
(STATE BEFORE MOUNTING)

THIRD EMBODIMENT
(STATE AFTER MOUNTING)

FOURTH EMBODIMENT

VIII-VIII CROSS-SECTION

VIII-VIII CROSS-SECTION
(SIDE OF EGR GAS PIPE 530)

FIG.20  FIRST MODIFICATION OF FIRST EMBODIMENT
(STATE AFTER MOUNTING)
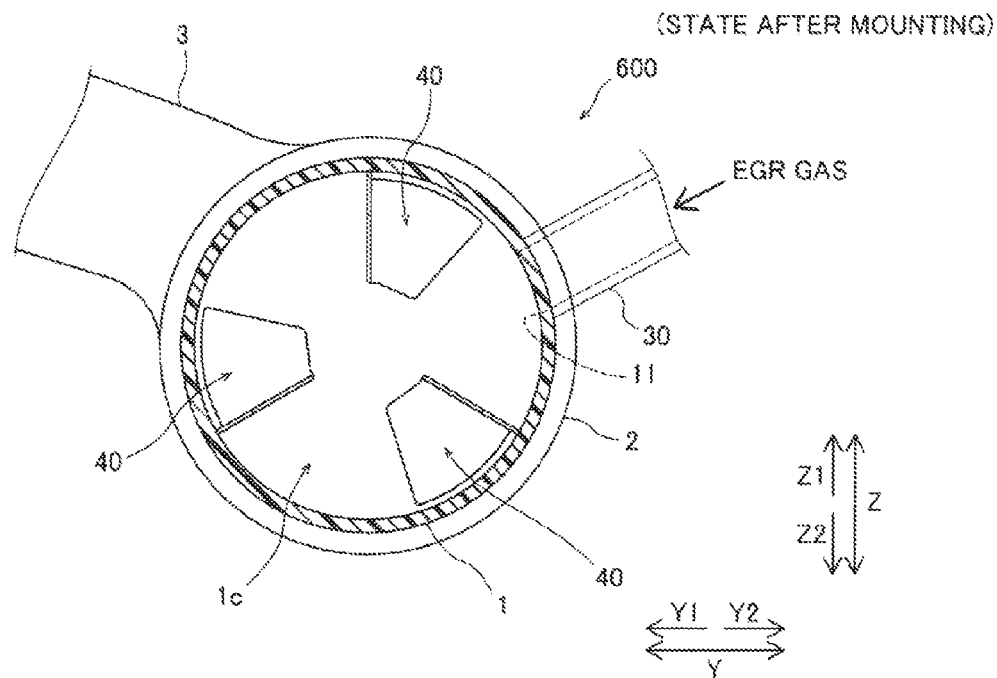
FIG.21  SECOND MODIFICATION OF FIRST EMBODIMENT
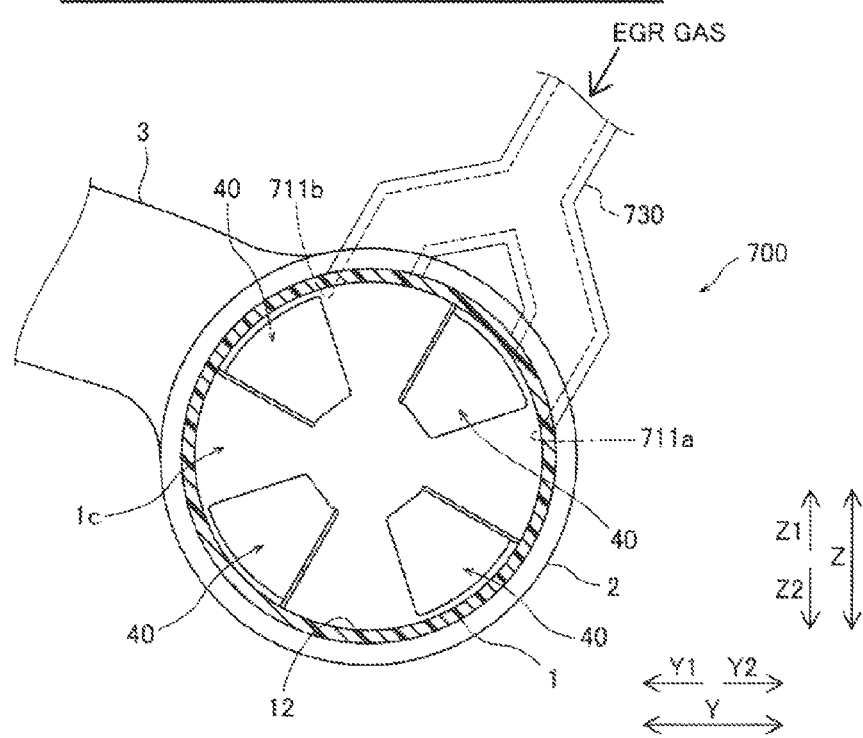

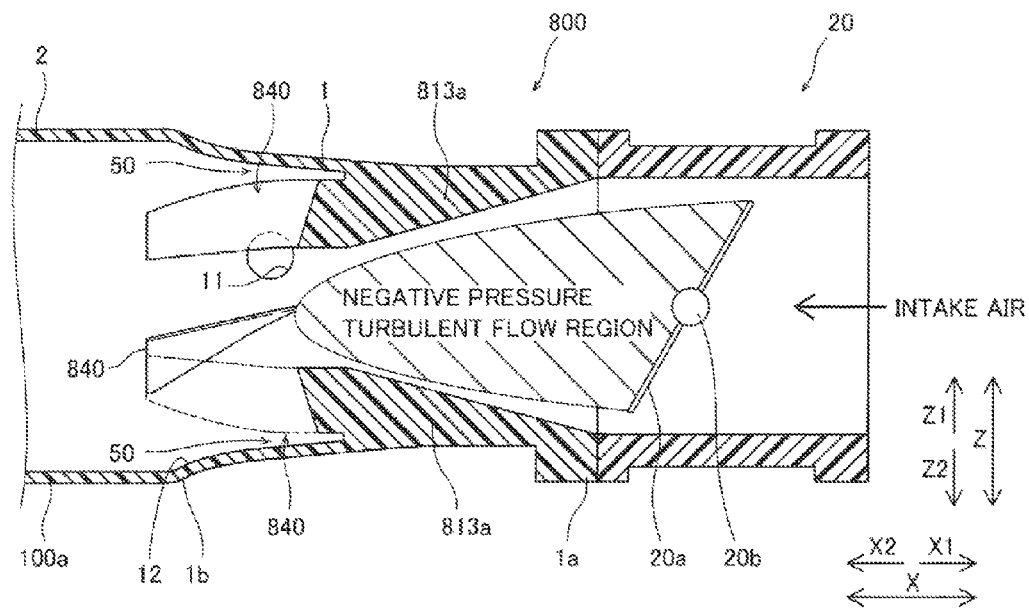
FIG.22 THIRD MODIFICATION OF FIRST EMBODIMENT

AIR INTAKE APPARATUS FOR INTERNAL COMBUSTION ENGINE

TECHNICAL FIELD

The present invention relates to an air intake apparatus for an internal combustion engine.

BACKGROUND ART

In general, an air intake apparatus for an internal combustion engine introducing external gas into a throttle-side air intake pipe is known. Such an air intake apparatus for an internal combustion engine is disclosed in Japanese Patent Laying-Open No. 2010-144669, for example.

In Japanese Patent Laying-Open No. 2010-144669, there is disclosed an air intake apparatus for an internal combustion engine including an air intake pipe (throttle-side air intake pipe) guiding intake air from a throttle to a main pipe portion (surge tank) and an EGR pipe introducing EGR gas (external gas) into the air intake pipe. In this air intake apparatus for an internal combustion engine, an outlet portion of the EGR pipe arranged in the air intake pipe is inclined to face to the main pipe portion (downstream side), whereby the outflow direction of the EGR gas from the EGR pipe is set to the downstream side and the concentration of the EGR gas introduced into each cylinder is equalized.

PRIOR ART

Patent Document

Patent Document 1: Japanese Patent Laying-Open No. 2010-144669

SUMMARY OF THE INVENTION

Problem to be Solved by the Invention

In the air intake apparatus for an internal combustion engine described in the aforementioned Japanese Patent Laying-Open No. 2010-144669, however, the EGR gas (external gas) introduced from the EGR pipe into the air intake pipe (throttle-side air intake pipe) simply flows downstream along the air intake pipe, and hence the EGR gas introduced from the EGR pipe in a state of being not sufficiently diffused to the intake air from the throttle conceivably flows into each cylinder. Thus, there is conceivably such a problem that the distribution accuracy of the EGR gas (external gas) to each cylinder is not satisfactory in the air intake apparatus for an internal combustion engine described in the aforementioned Japanese Patent Laying-Open No. 2010-144669.

The present invention has been proposed in order to solve the aforementioned problem, and an object of the present invention is to provide an air intake apparatus for an internal combustion engine capable of improving the distribution accuracy of external gas to each cylinder by further diffusing the external gas to intake air from a throttle.

Means for Solving the Problem

In order to attain the aforementioned object, an air intake apparatus for an internal combustion engine according to an aspect of the present invention includes a throttle-side air intake pipe having one end connected to a throttle and another end connected to a surge tank, an external gas inlet provided in at least one of the throttle-side air intake pipe and the surge tank, introducing external gas into at least one of the throttle-side air intake pipe and the surge tank, and a gas distributivity improvement fin provided inside at least one of the throttle-side air intake pipe and the surge tank, which corresponds to the external gas inlet, diffusing the external gas to intake air from the throttle.

In the air intake apparatus for an internal combustion engine according to the aspect of the present invention, as hereinabove described, the gas distributivity improvement fin diffusing external gas to intake air from the throttle is provided inside at least one of the throttle-side air intake pipe and the surge tank, which corresponds to the external gas inlet, whereby unlike the case where external gas is simply introduced into at least one of the throttle-side air intake pipe and the surge tank, diffusion of external gas to intake air from the throttle is further promoted by the gas distributivity improvement fin, and hence external gas can be further diffused to intake air from the throttle. Thus, the distribution accuracy of external gas to each cylinder can be improved by further diffusing external gas to intake air from the throttle. In this air intake apparatus for an internal combustion engine, the distribution accuracy of external gas to each cylinder is high, and hence the air intake apparatus for an internal combustion engine is useful particularly when the amount of external gas introduced from the external gas inlet is large (when the proportion of external gas is high).

In the aforementioned air intake apparatus for an internal combustion engine according to the aspect, the gas distributivity improvement fin preferably extends downstream in the flow direction of the intake air. According to this structure, even in the case where the gas distributivity improvement fin is provided, interruption of flow of intake air travelling downstream from the throttle can be suppressed by a portion of the gas distributivity improvement fin extending downstream in the flow direction, and hence the distribution accuracy of external gas to each cylinder can be improved while suppressing an increase in the pressure loss of intake air from the throttle by the gas distributivity improvement fin.

In this case, the gas distributivity improvement fin preferably includes a portion extending downstream in the flow direction of the intake air, spirally twisted. According to this structure, the flow of intake air travelling downstream in the flow direction from the throttle is swirled by the portion of the gas distributivity improvement fin spirally twisted, and hence external gas can be effectively diffused by the swirl flow.

In the aforementioned air intake apparatus for an internal combustion engine according to the aspect, the gas distributivity improvement fin is preferably arranged in the vicinity of a negative pressure turbulent flow region generated downstream of the throttle in the half-open state of the throttle. According to this structure, external gas can be guided to the negative pressure turbulent flow region generated in the vicinity of the throttle in a central portion (in the vicinity of the center) of a flow path cross-section of the throttle-side air intake pipe in the half-open state (partial state) of the throttle by the gas distributivity improvement fin, and hence external gas is allowed to counterflow into the negative pressure turbulent flow region. Thus, external gas can be more effectively diffused, and hence the distribution accuracy of external gas to each cylinder can be further improved.

In the aforementioned air intake apparatus for an internal combustion engine according to the aspect, a plurality of gas distributivity improvement fins are preferably provided inside the throttle-side air intake pipe, the plurality of gas distributivity improvement fins are preferably arranged in a state where the same are divided radially from the center of a flow path cross-section of the throttle-side air intake pipe, and the plurality of gas distributivity improvement fins are preferably not provided in a central portion of the flow path cross-section of the throttle-side air intake pipe but are preferably provided on the inner peripheral surface side of the throttle-side air intake pipe. According to this structure, external gas is further diffused by the plurality of gas distributivity improvement fins, and hence the distribution accuracy of external gas to each cylinder can be further improved. Furthermore, the plurality of gas distributivity improvement fins are arranged in the state where the same are divided radially from the center of the flow path cross-section of the throttle-side air intake pipe, whereby external gas can be guided to the central portion, and hence external gas can be easily guided to the negative pressure turbulent flow region generated in the central portion of the flow path cross-section downstream of the throttle. Furthermore, the plurality of gas distributivity improvement fins are not provided in the central portion of the flow path cross-section of the throttle-side air intake pipe but are provided on the inner peripheral surface side of the throttle-side air intake pipe, whereby hindrance of the plurality of gas distributivity improvement fins to generating negative pressure turbulent flow can be suppressed in the central portion (in the vicinity of the center) of the flow path cross-section of the throttle-side air intake pipe, and hence external gas can effectively counterflow to the negative pressure turbulent flow region to be diffused. In addition, unlike the case where the plurality of gas distributivity improvement fins are provided in the central portion of the flow path cross-section of the throttle-side air intake pipe, an increase in the pressure loss of intake air from the throttle by the plurality of gas distributivity improvement fins can be suppressed.

In this case, the external gas inlet is preferably provided between the plurality of gas distributivity improvement fins. According to this structure, external gas introduced from the external gas inlet can be smoothly guided to the negative pressure turbulent flow region generated in the central portion (in the vicinity of the center) of the flow path cross-section of the throttle-side air intake pipe by the gas distributivity improvement fins on both sides of the external gas inlet.

In the aforementioned structure in which the gas distributivity improvement fins are provided inside the throttle-side air intake pipe, a portion of the throttle-side air intake pipe provided with the gas distributivity improvement fins is preferably larger in flow path sectional area than a portion on the upstream side of the portion of the throttle-side air intake pipe provided with the gas distributivity improvement fins. According to this structure, the flow path sectional area in the portion of the throttle-side air intake pipe provided with the gas distributivity improvement fins is increased as compared with that in the portion on the upstream side of the portion, and hence a reduction in the flow path sectional area resulting from providing the gas distributivity improvement fins can be compensated. Consequently, an increase in the pressure loss of intake air can be suppressed even in the case where the gas distributivity improvement fins are provided, and hence the distribution accuracy of external gas to each cylinder can be improved by diffusing external gas by the gas distributivity improvement fins while suppressing an increase in the pressure loss of intake air.

The aforementioned air intake apparatus for an internal combustion engine according to the aspect preferably further includes a fin component in which a cylindrical portion constituting a part of the throttle-side air intake pipe and the gas distributivity improvement fin are integrally provided, and the fin component is preferably mounted on an air intake apparatus body. According to this structure, the gas distributivity improvement fin can be easily arranged inside the air intake apparatus body by employing the fin component in which the gas distributivity improvement fin is integrally provided in the cylindrical portion constituting a part of the throttle-side air intake pipe.

In the aforementioned structure further including the fin component, the air intake apparatus body preferably includes a first air intake apparatus body portion and a second air intake apparatus body portion having portions constituting the throttle-side air intake pipe, and the fin component is preferably mounted on the first air intake apparatus body portion and the second air intake apparatus body portion by holding the cylindrical portion of the fin component between the first air intake apparatus body portion and the second air intake apparatus body portion. According to this structure, the cylindrical portion in the fin component is held by the first air intake apparatus body portion and the second air intake apparatus body portion, and hence the fin component can be easily fixed to a prescribed position inside the air intake apparatus body including the first air intake apparatus body portion and the second air intake apparatus body portion.

In the aforementioned structure further including the fin component, the length of the cylindrical portion of the fin component is preferably smaller than the length of the gas distributivity improvement fin in the central axis direction of the throttle-side air intake pipe, and the cylindrical portion of the fin component is preferably provided in an upstream portion of the gas distributivity improvement fin in the central axis direction of the throttle-side air intake pipe. According to this structure, the area of the gas distributivity improvement fin mounted on the air intake apparatus body can be further reduced within a range where the fin component can be mounted while sufficiently ensuring the length of the gas distributivity improvement fin and maintaining the distribution accuracy of external gas to each cylinder. Furthermore, the cylindrical portion is provided in the upstream portion of the gas distributivity improvement fin, whereby a downstream portion of the gas distributivity improvement fin in the fin component can be formed in an intended shape.

In the aforementioned structure further including the fin component, the external gas inlet is preferably provided in a region of the throttle-side air intake pipe upstream of a downstream end of the gas distributivity improvement fin in the central axis direction of the throttle-side air intake pipe, and the external gas inlet is preferably provided upstream of the downstream end of the gas distributivity improvement fin and downstream of the cylindrical portion of the fin component in the central axis direction of the throttle-side air intake pipe. According to this structure, external gas introduced from the external gas inlet can be promptly merged into swirl flow of intake air formed by the gas distributivity improvement fin to promote diffusion of external gas to intake air. Furthermore, the external gas inlet can be distanced from the throttle located on the upstream side of the cylindrical portion, and hence attachment of deposit on the throttle following introduction of external gas and malfunction of the throttle can be avoided while promoting diffusion of external gas to intake air.

In the aforementioned structure further including the fin component, the throttle-side air intake pipe preferably includes a first pipe expansion portion provided in a region in the vicinity of the cylindrical portion on the upstream side of the cylindrical portion of the fin component in the central axis direction of the throttle-side air intake pipe, whose flow path sectional area is larger than that of a portion on the upstream side thereof and a second pipe expansion portion provided in a region on the downstream side of the cylindrical portion of the fin component in the central axis direction of the throttle-side air intake pipe, in which the gas distributivity improvement fin is located, whose flow path sectional area is larger than that of the cylindrical portion, and the external gas inlet is preferably provided in the second pipe expansion portion. According to this structure, a reduction in the flow path sectional area resulting from providing the gas distributivity improvement fin can be compensated by an increase in the flow path sectional area by the first pipe expansion portion and the second pipe expansion portion, and hence the flow path sectional area not generating the pressure loss of intake air can be ensured in the throttle-side air intake pipe even in the case where the gas distributivity improvement fin is provided. Furthermore, the external gas inlet is provided in the second pipe expansion portion, whereby external gas can be directly merged into agitation flow (swirl flow) of intake air formed by the gas distributivity improvement fin arranged in the region corresponding to the second pipe expansion portion, and hence diffusion (mixing) of external gas to intake air can be effectively promoted.

The aforementioned air intake apparatus for an internal combustion engine according to the aspect preferably further includes an external gas pipe connected to the external gas inlet, supplying external gas to the external gas inlet and is preferably provided with an offset portion in which a central axis of the external gas inlet and a central axis of the external gas pipe are offset with respect to each other. According to this structure, the offset portion can generate flow path resistance in the flow of external gas circulating in the external gas pipe to reduce the flow velocity of external gas before the external gas inlet. In other words, it is undesirable to introduce external gas into intake air at a flow velocity exceeding the optimum flow velocity of external gas for the gas distributivity improvement fin according to the present invention when introducing a larger amount of external gas in order to improve the specific fuel consumption of an internal combustion engine. In this case, the offset portion according to the present invention in which the external gas pipe and the external gas inlet are offset with respect to each other can reduce the flow velocity of external gas, and hence external gas is introduced into at least one of the throttle-side air intake pipe and the surge tank in a state where the flow velocity of external gas is reduced. Thus, external gas can be sufficiently diffused into intake air from the throttle. Therefore, the synergistic effect with the gas distributivity improvement fin can be obtained to further improve the distributivity accuracy of external gas to each cylinder.

In the aforementioned structure further including the external gas pipe, the inner diameter of the external gas inlet is preferably larger than the inner diameter of the external gas pipe in the structure provided with the offset portion. According to this structure, while external gas circulates in the external gas pipe and reaches the external gas inlet, the inner flow path diameter is increased thereby increasing the flow path sectional area, and hence in addition to a reduction in the flow velocity of external gas by the offset portion, the flow velocity of external gas in the external gas inlet can be reliably reduced. Furthermore, the inner diameter of the external gas pipe can be smaller as compared with that of the external gas inlet to reduce the piping volume, and hence the responsiveness of the air intake apparatus during transient control can be improved.

In the aforementioned structure further including the external gas pipe, the offset portion is preferably formed in a connection between at least one of the throttle-side air intake pipe and the surge tank, which is provided with the external gas inlet, and the external gas pipe. According to this structure, the offset portion is arranged close to at least one of the throttle-side air intake pipe and the surge tank, and hence the flow path length from the offset portion to the external gas inlet on a downstream side can be reduced as much as possible. Therefore, the flow path volume from the offset portion to the external gas inlet can be reduced, and hence the responsiveness of the air intake apparatus during transient control can be improved.

According to the present invention, the following structure is also possible.

In other words, in the aforementioned structure of the air intake apparatus for an internal combustion engine in which the gas distributivity improvement fin is provided inside the throttle-side air intake pipe, a clearance is preferably provided between the gas distributivity improvement fin and the inner peripheral surface of the throttle-side air intake pipe. According to this structure, turbulent flow generated by a pressure difference between one surface side of the gas distributivity improvement fin and the other surface side can be generated not only in a downstream end of the gas distributivity improvement fin but also in the clearance between the gas distributivity improvement fin and the inner peripheral surface of the throttle-side air intake pipe, and hence diffusion of external gas can be further promoted.

In the aforementioned air intake apparatus for an internal combustion engine, the gas distributivity improvement fin is preferably provided to extend from the inside of the throttle-side air intake pipe to the inside of the surge tank. According to this structure, diffusion of external gas to intake air from the throttle is promoted by the gas distributivity improvement fin not only inside the throttle-side air intake pipe but also inside the surge tank, and hence external gas can be further diffused to intake air from the throttle.

In the aforementioned structure of the air intake apparatus for an internal combustion engine in which the air intake apparatus body includes the first air intake apparatus body portion and the second air intake apparatus body portion, the cylindrical portion of the fin component preferably includes a protrusion portion provided in an outer peripheral portion of the cylindrical portion, and the fin component is mounted on the first air intake apparatus body portion and the second air intake apparatus body portion by holding the protrusion portion between a bonding surface of the first air intake apparatus body portion and a bonding surface of the second air intake apparatus body portion. According to this structure, the fin component can be reliably fixed to the inside of the air intake apparatus body, utilizing the protrusion portion provided in the outer peripheral portion of the cylindrical portion opposite to a flow path (inside) for intake air. Therefore, slip or position aberration of the entire fin component in the flow path for intake air resulting from generation of intake air pulsation or vibration of an internal combustion engine can be easily avoided.

In the aforementioned structure in which the cylindrical portion of the fin component includes the protrusion portion, a bonding surface of the first air intake apparatus body portion and a bonding surface of the second air intake apparatus body portion are preferably welded to each other in a state where the fin component is held between the first air intake apparatus body portion and the second air intake apparatus body portion, and the protrusion portion of the cylindrical portion of the fin component is preferably in the form of a rib welded to the bonding surface of the first air intake apparatus body portion and the bonding surface of the second air intake apparatus body portion. According to this structure, the bonding surfaces can be easily welded to each other in a state where the protrusion portion of the fin component in the form of a rib is held between the bonding surfaces, and hence the fin component that is a separate component at the time of assembly can be easily integrated with the air intake apparatus body. Furthermore, in a step of weld-bonding the first air intake apparatus body portion and the second air intake apparatus body portion, the protrusion portion of the fin component in the form of a rib can be welded simultaneously, and hence no step of mounting the fin component may be provided separately. Consequently, even in the case where the fin component is provided, the manufacturing process is not complicated.

In the aforementioned structure further including the fin component, portions of the first air intake apparatus body portion and the second air intake apparatus body portion between which the cylindrical portion of the fin component is held preferably have grooves formed such that the cylindrical portion can be embedded, and the inner peripheral surface of the air intake apparatus body and the inner peripheral surface of the cylindrical portion are preferably connected to each other, having continuity in a state where the cylindrical portion is embedded into the grooves. According to this structure, the fin component can be reliably arranged at a prescribed position inside the air intake apparatus body, utilizing a fitting state between the cylindrical portion of the fin component and the groove formed in each of the first air intake apparatus body portion and the second air intake apparatus body portion. Furthermore, the inner peripheral surface of the air intake apparatus body and the inner peripheral surface of the cylindrical portion are smoothly connected to each other, and hence an increase in the circulation resistance of intake air resulting from the embedment of the cylindrical portion can be reliably avoided.

In the aforementioned air intake apparatus for an internal combustion engine, external gas is preferably any of recirculated exhaust gas, blow-by gas, and evaporative fuel gas generated in a fuel tank. According to this structure, the gas distributivity improvement fin can further diffuse any of recirculated exhaust gas, blow-by gas, and evaporative fuel gas to intake air from the throttle to improve the distribution accuracy to each cylinder.

According to the present application, in addition to the aforementioned air intake apparatus for an internal combustion engine according to the aspect, another structure described below is conceivable.

In other words, an air intake apparatus for an internal combustion engine according to another structure of the present application includes a throttle-side air intake pipe having one end connected to a throttle and another end connected to a surge tank, an external gas inlet provided in at least one of the throttle-side air intake pipe and the surge tank, introducing external gas into at least one of the throttle-side air intake pipe and the surge tank, and a fin provided inside at least one of the throttle-side air intake pipe and the surge tank, which corresponds to the external gas inlet, spirally twisted downstream of intake air from the throttle. According to this structure, the flow of intake air from the throttle is swirled by the fin spirally twisted, and hence diffusion of external gas to intake air can be promoted by the swirl flow. Thus, the distribution accuracy of external gas to each cylinder can be improved by further diffusing external gas to intake air from the throttle.

In this air intake apparatus for an internal combustion engine according to another structure, the fin is preferably arranged in the vicinity of a negative pressure turbulent flow region generated downstream of the throttle in the half-open state of the throttle and is preferably formed in a shape along an outer edge of the negative pressure turbulent flow region. According to this structure, the fin can guide external gas to the negative pressure turbulent flow region generated downstream of the throttle in the half-open state (partial state) of the throttle, and hence external gas is allowed to counterflow into the negative pressure turbulent flow region. Thus, external gas can be more effectively diffused, and hence the distribution accuracy of external gas to each cylinder can be further improved. Furthermore, the fin is formed in the shape along the outer edge of the negative pressure turbulent flow region, whereby the fin can more smoothly guide external gas to the negative pressure turbulent flow region, and hence diffusion of external gas can be further promoted.

Effect of the Invention

According to the present invention, as hereinabove described, the distribution accuracy of external gas to each cylinder can be improved by further diffusing external gas to intake air from the throttle.

BRIEF DESCRIPTION OF THE DRAWINGS

FIG. 20 A diagram showing a structure of providing three fins according to a first modification of the first embodiment of the present invention.

FIG. 21 A diagram showing a structure of providing two external gas inlets according to a second modification of the first embodiment of the present invention.

FIG. 22 A diagram showing a structure of projecting an upstream edge side of a fin to an upstream side along an outer edge of a negative pressure turbulent flow region according to a third modification of the first embodiment of the present invention.

MODES FOR CARRYING OUT THE INVENTION

Embodiments of the present invention are hereinafter described on the basis of the drawings.

First Embodiment

The structure of an air intake apparatus 100 for an internal combustion engine according to a first embodiment of the present invention is described with reference to FIGS. 1 to 8.

Figure 1:
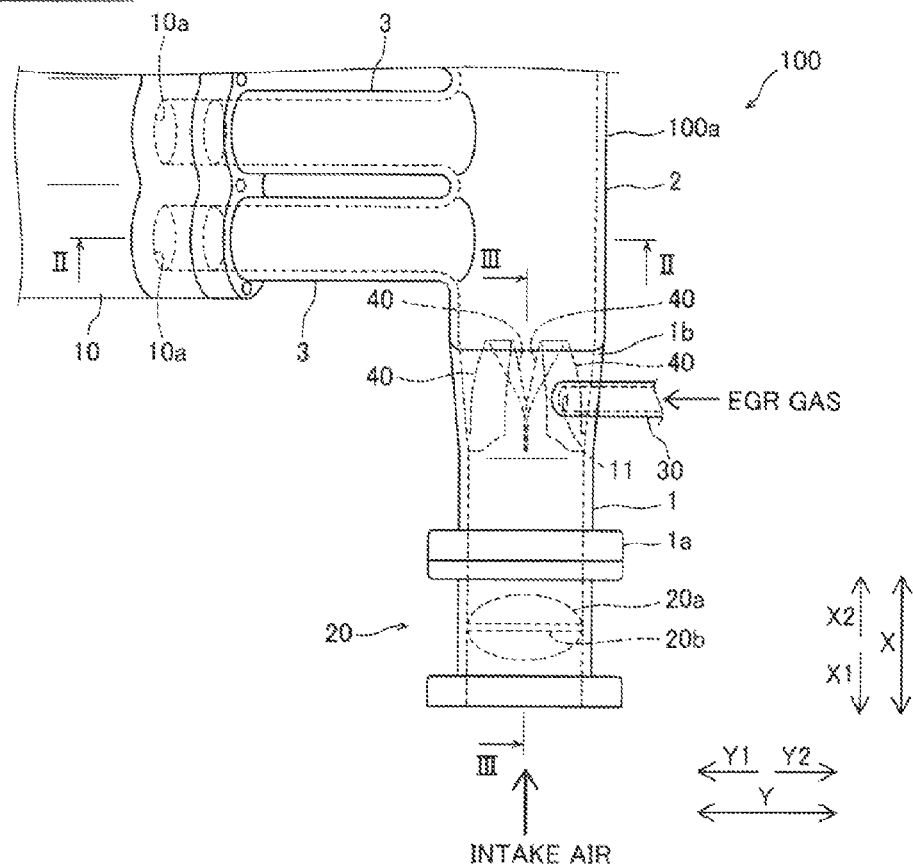
FIG. 1 A plan view showing the structure of an air intake apparatus according to a first embodiment of the present invention.

The air intake apparatus 100 for an internal combustion engine according to the first embodiment of the present invention is an air intake apparatus for an automotive multi-cylinder engine 10. The air intake apparatus 100 is configured such that intake air arriving through an unshown air cleaner and a throttle 20 flows thereinto, as shown in FIG. 1. The air intake apparatus 100 is provided on the upstream side of the multi-cylinder engine 10 and guides intake air to each cylinder of the engine 10. The air intake apparatus 100 is configured such that recirculated exhaust gas (EGR (Exhaust Gas Recirculation) gas) returns thereto. The engine 10 is an example of the "internal combustion engine" in the present invention. The EGR gas is an example of the "external gas" in the present invention.

Figure 2:
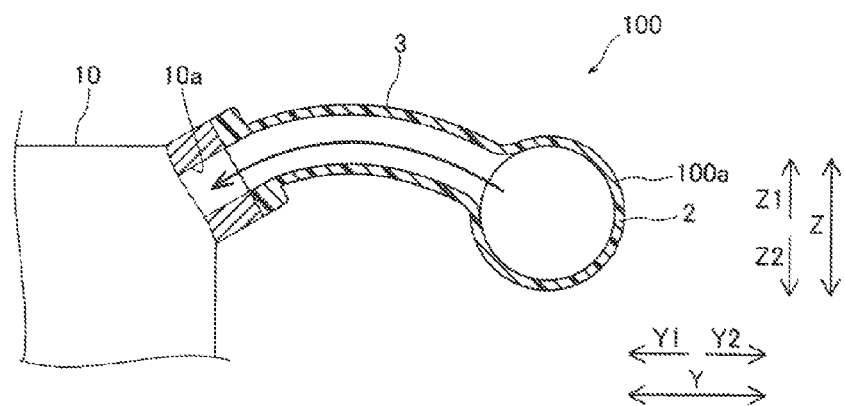
FIG. 2 A partial sectional view taken along the line II-II in FIG. 1.

The engine 10 has a plurality of air-intakes 10a provided for each cylinder, the plurality of intakes 10a are connected to respective air intake ports 3 of the air intake apparatus 100 described later, as shown in FIGS. 1 and 2. The throttle 20 is provided with a rotary throttle valve 20a, and a rotating shaft 20b of the throttle valve 20a is provided to extend in a direction (horizontal direction (direction Y)) orthogonal to the pipe axis direction (direction X) of the throttle 20. In other words, the throttle valve 20a is configured to rotate in a vertical direction (direction Z) about the rotating shaft 20b arranged in the horizontal direction.

The air intake apparatus 100 includes a cylindrical throttle-side air intake pipe 1 located downstream of the throttle 20, a surge tank 2 located downstream of the throttle-side air intake pipe 1, and the plurality of air intake ports 3 located downstream of the surge tank 2, as shown in FIG. 1. The throttle-side air intake pipe 1, the surge tank 2, and the plurality of air intake ports 3 are integrally formed by an air intake apparatus body 100a made of resin. The surge tank 2 is in the form of a circular pipe extending along the pipe axis direction (direction X) of the throttle-side air intake pipe 1. The plurality of air intake ports 3 are connected to the upper side (Z1 direction side) of a side circumferential portion of the surge tank 2 and parallel each other along the pipe axis direction (direction X) of the surge tank 2.

Figure 3:
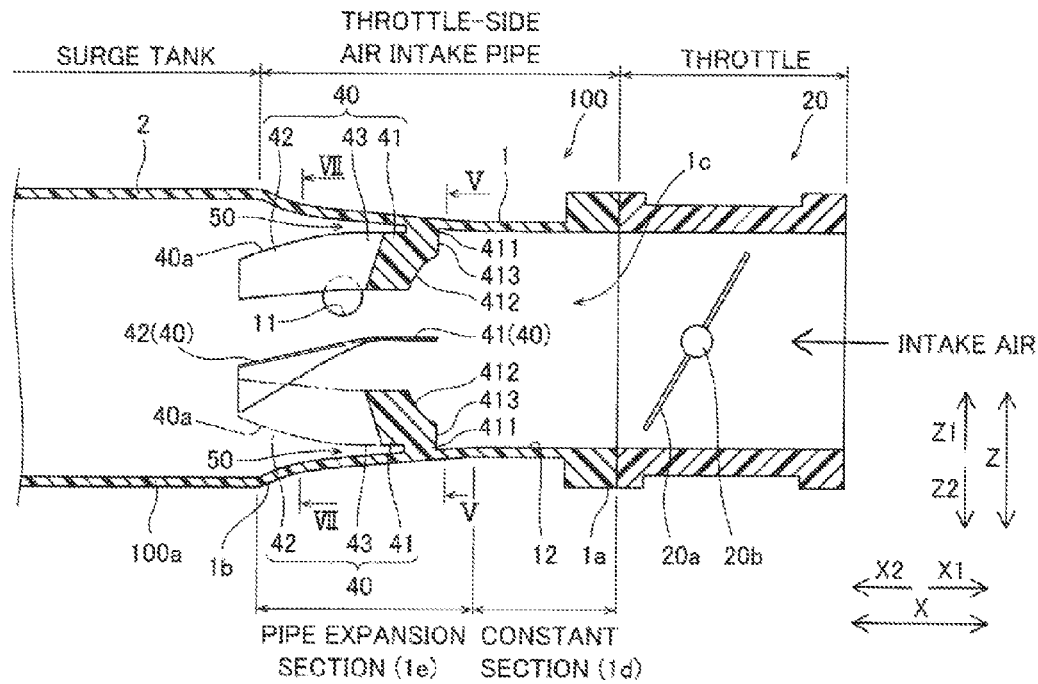
FIG. 3 A sectional view taken along the line III-III in FIG. 1.
Figure 4:
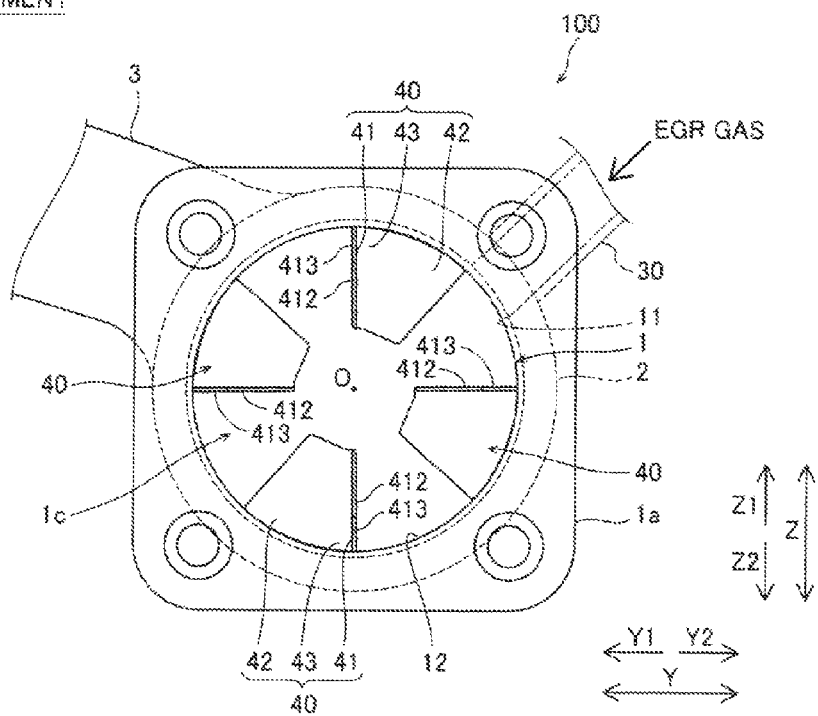
FIG. 4 A diagram of the air intake apparatus according to the first embodiment of the present invention, as viewed from one end side.
Figure 5:
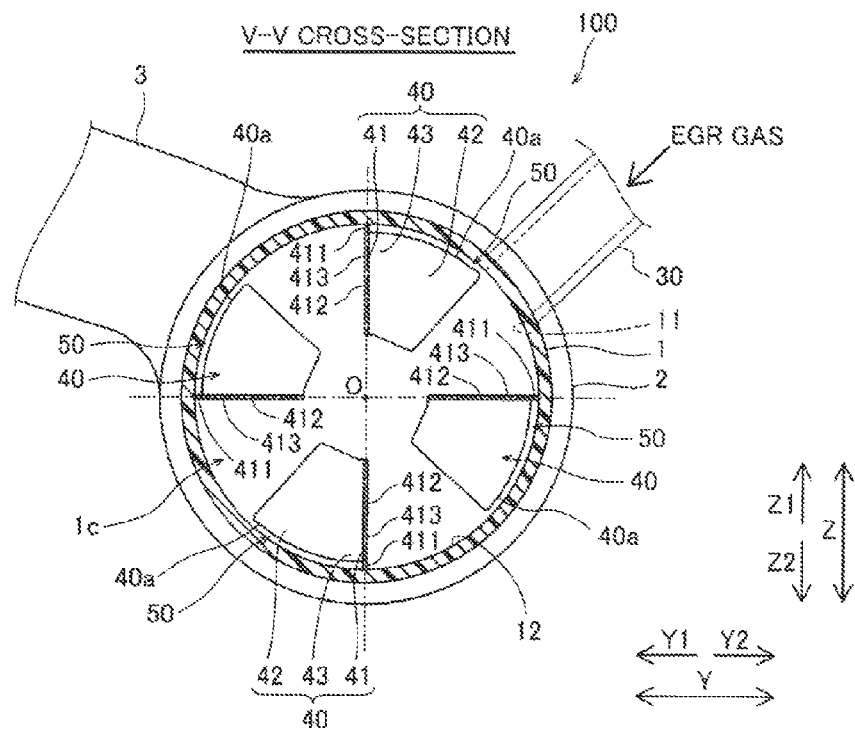
FIG. 5 A sectional view taken along the line V-V in FIG. 3.

According to the first embodiment, one end 1a (an end on the upstream side) of the throttle-side air intake pipe 1 is connected to the throttle 20, and another end 1b (an end on the downstream side) is connected to the surge tank 2, as shown in FIGS. 1 and 3. The throttle-side air intake pipe 1 is mounted with a single EGR gas pipe 30 (see FIGS. 1, 4, and 5) in which EGR gas circulates. A portion of the EGR gas pipe 30 connected to the throttle-side air intake pipe 1 is formed to be directed toward the center O of a circular cross-section of a flow path 1c of the throttle-side air intake pipe 1, as shown in FIGS. 4 and 5.

An external gas inlet 11 for introducing EGR gas into the throttle-side air intake pipe 1 is provided at a position of the throttle-side air intake pipe 1 corresponding to the EGR gas pipe 30. EGR gas is introduced into the throttle-side air intake pipe 1 through the external gas inlet 11 when the throttle valve 20a is in a half-open state (partial state). Four fins 40 diffusing EGR gas to intake air from the throttle 20 are provided in the throttle-side air intake pipe 1. The fins 40 are examples of the "gas distributivity improvement fin" in the present invention.

The pipe diameter of the throttle-side air intake pipe 1 gradually increases toward the downstream side, whereby the sectional area of the flow path 1c gradually increases toward the downstream side. Detailedly, the throttle-side air intake pipe 1 includes a constant section 1d in which the sectional area (inner diameter) of the flow path 1c is constant and a pipe expansion section 1e in which the sectional area (inner diameter) of the flow path 1c gradually increases downstream, as shown in FIG. 3. The constant section 1d is located upstream of the pipe expansion section 1e, and the four fins 40 are provided in the pipe expansion section 1e. In other words, the sectional area (inner diameter) of the flow path 1c in a portion (pipe expansion section 1e) of the throttle-side air intake pipe 1 provided with the fins 40 is larger than that in a portion (constant section 1d) on the upstream side of the portion of the throttle-side air intake pipe 1 provided with the fins 40. Thus, a reduction in the flow path sectional area resulting from providing the four fins 40 is compensated. Consequently, according to the first embodiment, the actual flow path sectional area (the sectional area in which intake air can circulate) of the pipe expansion section 1e is at least that of the constant section 1d despite the fact that the four fins 40 are provided.

Figure 7:
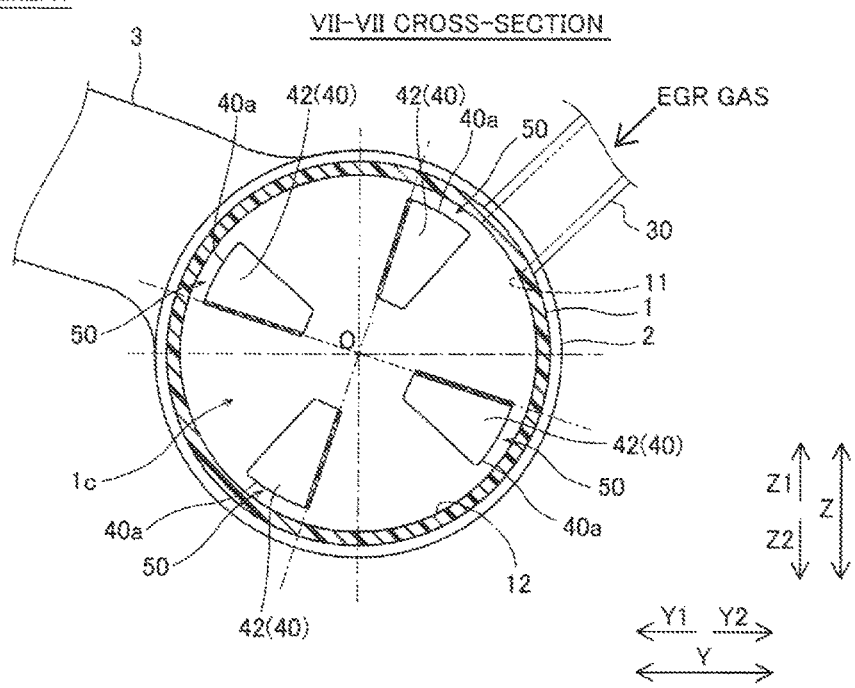
FIG. 7 A sectional view taken along the line VII-VII in FIG. 3.
Figure 8:
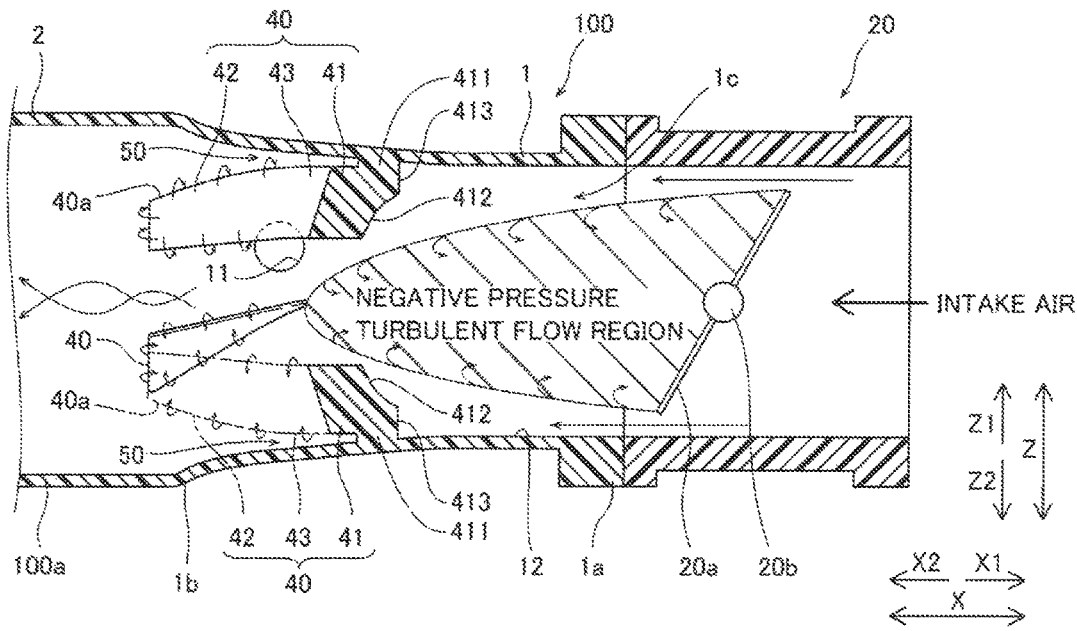
FIG. 8 A diagram for illustrating the diffusion state of EGR gas in the air intake apparatus according to the first embodiment of the present invention.

The four fins 40 are formed in the same shape and are arranged at a position corresponding to the external gas inlet 11. Specifically, the four fins 40 are arranged at a position overlapping with the external gas inlet 11 in the pipe axis direction (direction X) of the throttle-side air intake pipe 1, as shown in FIG. 3. In other words, the external gas inlet 11 is arranged in the vicinity of a central portion of the four fins 40 in the pipe axis direction (direction X). The four fins 40 are arranged at equal angular (90 degrees) intervals in the circumferential direction of the inner peripheral surface 12 of the cylindrical throttle-side air intake pipe 1, and the external gas inlet 11 is provided on the upper side (Z1 direction side) of the throttle-side air intake pipe 1 between adjacent two fins 40, as shown in FIGS. 3 to 5. The external gas inlet 11 is arranged in the vicinity of the downstream of the throttle 20. Detailedly, the external gas inlet 11 is arranged in the vicinity of a negative pressure turbulent flow region generated downstream of the throttle valve 20a in the half-open state (partial state) of the throttle valve 20a, as shown in FIG. 8. The four fins 40 are arranged in a state where the same are divided radially from the center O of the cross-section of the circular flow path 1c of the throttle-side air intake pipe 1, as shown in FIGS. 4 and 5. The four fins 40 are configured such that cross-sections thereof in a direction orthogonal to the pipe axis direction of the throttle-side air intake pipe 1 extend radially from the center O, as shown in FIG. 7, over an entire region in a longitudinal direction (the direction X in FIG. 8). The four fins 40 is not provided in a central portion (a portion in the vicinity of the center O) of the cross-section of the circular flow path 1c of the throttle-side air intake pipe 1 but are arranged on the side of the inner peripheral surface 12 of the throttle-side air intake pipe 1.

Figure 6:
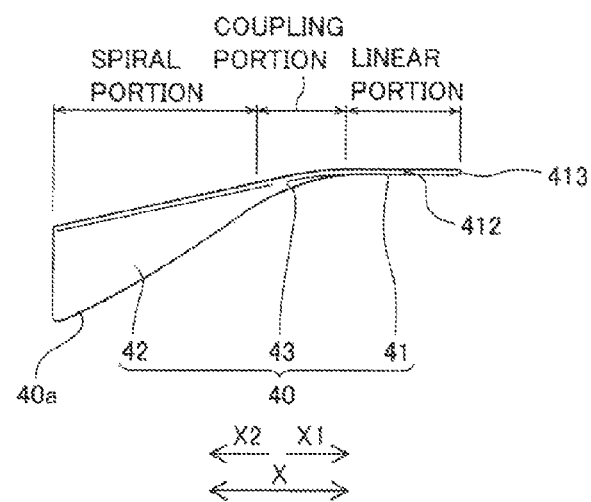
FIG. 6 An enlarged view showing a fin of the air intake apparatus according to the first embodiment of the present invention.

The fins 40 are provided to extend along the pipe axis direction (direction X) from the inside of the throttle-side air intake pipe 1 to the inside of the surge tank 2, as shown in FIG. 3. The fins 40 have linear portions 41 provide on the upstream side, linearly extending downstream of intake air, spiral portions 42 provided on the downstream side, spirally twisted downstream of intake air, and coupling portions 43 coupling the linear portions 41 and the spiral portions 42, as shown in FIGS. 3 to 6. The linear portions 41 extend linearly along the pipe axis direction (direction X) of the throttle-side air intake pipe 1. The spiral portions 42 are twisted spirally at a constant angle, as shown in FIGS. 6 and 7. As shown in FIG. 6, the length of the spiral portion 42 is larger than the length of the linear portion 41 in the pipe axis direction (direction X) of the throttle-side air intake pipe 1. The fins 40 are connected to the inner peripheral surface 12 of the throttle-side air intake pipe 1 through connection portions 411 in the linear portions 41, as shown in FIGS. 3 and 5. The four fins 40 are made of resin and are integrally provided in the throttle-side air intake pipe 1.

As shown in FIGS. 3, 5, and 7, clearances 50 extending downstream of intake air are provided between the fins 40 and the inner peripheral surface 12 of the throttle-side air intake pipe 1. End sides 40a of the fins 40 closer to the inner peripheral surface 12 other than portions provided with the connection portions 411 each have a substantially constant distance in a radial direction from the center O of the throttle-side air intake pipe 1 over an entire region in the pipe axis direction (direction X) of the throttle-side air intake pipe 1. In other words, the sectional area of the flow path 1c gradually increases downstream in the pipe expansion section 1e of the throttle-side air intake pipe 1, so that the clearances 50 between the fins 40 and the inner peripheral surface 12 of the throttle-side air intake pipe 1 gradually increase in size (the clearances 50 at a position (downstream side) in FIG. 7 are larger in size than the clearances 50 at a position in FIG. 5), as shown in FIGS. 5 and 7.

The fins 40 are arranged in the vicinity of the negative pressure turbulent flow region generated downstream of the throttle valve 20a outside the negative pressure turbulent flow region in the half-open state (partial state) of the throttle valve 20a, as shown in FIG. 8. The negative pressure turbulent flow region is a region in the central portion (in the vicinity of the center O) of the cross-section of the flow path of the throttle-side air intake pipe 1 in the vicinity of the downstream of the throttle valve 20a, where negative pressure and turbulent flow are generated in the half-open state (partial state) of the throttle valve 20a. Portions on the inner side (the side of the center O) of the flow path 1c, of end sides 413 of the fins 40 on the upstream side are formed with chamfer portions 412. Hindrance of the fins 40 to generating the negative pressure turbulent flow region can be suppressed by these chamfer portions 412.

A mechanism of diffusing EGR gas to intake air from the throttle 20 in the half-open state (partial state) of the throttle valve 20a is now described with reference to FIG. 8.

In the half-open state (partial state) of the throttle valve 20a, EGR gas introduced into the throttle-side air intake pipe 1 through the external gas inlet 11 is guided by two fins 40 arranged on both sides of the external gas inlet 11 to be guided to the central portion of the cross-section of the flow path 1c of the throttle-side air intake pipe 1. Then, EGR gas counterflows upstream (X1 direction side) by the negative pressure of the negative pressure turbulent flow region generated downstream of the throttle valve 20a in the central portion of the cross-section of the flow path 1c provided with no fin 40. In the negative pressure turbulent flow region, vortex flow shown by arrows in FIG. 8 is generated, and hence mixing (diffusion) of EGR gas counterflowing into the negative pressure turbulent flow region and intake air from the throttle 2 is promoted by this vortex flow. When the EGR gas and the intake air diffused in the negative pressure turbulent flow region pass through the fins 40 downstream, turbulent flow shown by arrows in FIG. 8 is generated over the entire regions of the fins 40 by a pressure difference resulting from a flow velocity difference between one surface side of the fins 40 and the other surface side. Thus, diffusion of EGR gas is promoted. With respect to EGR gas and intake air flowing toward the inside of the surge tank 2, swirl flow shown by arrows in FIG. 8 is generated by the spiral portions 42 of the fins 40, and hence diffusion of EGR gas is further promoted.

According to the first embodiment, as hereinabove described, the fins 40 diffusing EGR gas to intake air from the throttle 20 are provided inside the throttle-side air intake pipe 1 corresponding to the external gas inlet 11, whereby unlike the case where EGR gas is simply introduced into the throttle-side air intake pipe 1, diffusion of EGR gas to intake air from the throttle 20 is further promoted by the fins 40, and hence EGR gas can be further diffused to intake air from the throttle 20. Thus, the distribution accuracy of EGR gas to each cylinder can be improved by further diffusing EGR gas to intake air from the throttle 20.

According to the first embodiment, as hereinabove described, the linear portions 41 and the spiral portions 42 extending downstream in the flow direction of intake air are provided in the fins 40. Thus, even in the case where the fins 40 are provided, interruption of flow of intake air travelling downstream in the flow direction from the throttle 20 can be suppressed by the linear portions 41 and the spiral portions 42 extending downstream, and hence the distribution accuracy of EGR gas to each cylinder can be improved while suppressing an increase in the pressure loss of intake air from the throttle 20 by the fins 40.

According to the first embodiment, as hereinabove described, the spiral portions 42 extending downstream in the flow direction of intake air, spirally twisted are provided in the fins 40. Thus, the flow of intake air travelling downstream in the flow direction from the throttle 20 is swirled by the spiral portions 42 of the fins 40, and hence EGR gas can be effectively diffused by the swirl flow.

According to the first embodiment, as hereinabove described, the fins 40 are arranged in the vicinity of the negative pressure turbulent flow region generated downstream of the throttle valve 20a in the half-open state of the throttle valve 20a. Thus, EGR gas can be guided to the negative pressure turbulent flow region generated in the vicinity of the throttle valve 20a in the central portion (in the vicinity of the center O) of the cross-section of the flow path of the throttle-side air intake pipe 1 in the half-open state (partial state) of the throttle valve 20a by the fins 40, and hence EGR gas is allowed to counterflow into the negative pressure turbulent flow region. Thus, EGR gas can be more effectively diffused, and hence the distribution accuracy of EGR gas to each cylinder can be further improved.

According to the first embodiment, as hereinabove described, a plurality of fins 40 are arranged in the state where the same are divided radially from the center O of the cross-section of the flow path of the throttle-side air intake pipe 1. Thus, EGR gas is further diffused by the plurality of fins 40, and hence the distribution accuracy of EGR gas to each cylinder can be further improved. Furthermore, the plurality of fins 40 are arranged in the state where the same are divided radially from the center O of the cross-section of the flow path of the throttle-side air intake pipe 1, whereby EGR gas can be guided to the central portion, and hence EGR gas can be easily guided to the negative pressure turbulent flow region generated in the central portion of the cross-section of the flow path downstream of the throttle 20.

According to the first embodiment, as hereinabove described, the external gas inlet 11 is provided between the plurality of fins 40. Thus, EGR gas introduced from the external gas inlet 11 can be smoothly guided to the negative pressure turbulent flow region generated in the central portion (in the vicinity of the center O) of the cross-section of the flow path of the throttle-side air intake pipe 1 by the fins 40 on both sides of the external gas inlet 11.

According to the first embodiment, as hereinabove described, the plurality of fins 40 are not provided in the central portion of the cross-section of the flow path of the throttle-side air intake pipe 1 but are provided on the side of the inner peripheral surface 12 of the throttle-side air intake pipe 1. Thus, hindrance of the plurality of fins 40 to generating negative pressure turbulent flow can be suppressed in the central portion (in the vicinity of the center O) of the cross-section of the flow path of the throttle-side air intake pipe 1, and hence EGR gas can effectively counterflow to the negative pressure turbulent flow region to be diffused. Furthermore, unlike the case where the plurality of fins 40 are provided in the central portion of the cross-section of the flow path of the throttle-side air intake pipe 1, an increase in the pressure loss of intake air from the throttle 20 by the plurality of fins 40 can be suppressed.

According to the first embodiment, as hereinabove described, the sectional area (inner diameter) of the flow path 1c in the portion (pipe expansion section 1e) of the throttle-side air intake pipe 1 provided with the fins 40 is larger than that in the portion (constant section 1d) on the upstream side of the portion of the throttle-side air intake pipe 1 provided with the fins 40. Thus, the sectional area of the flow path in the portion (pipe expansion section 1e) of the throttle-side air intake pipe 1 provided with the fins 40 is increased as compared with that in the portion (constant section 1d) on the upstream side of the portion, and hence a reduction in the sectional area of the flow path resulting from providing the fins 40 can be compensated. Consequently, an increase in the pressure loss of intake air can be suppressed even in the case where the fins 40 are provided, and hence the distribution accuracy of EGR gas to each cylinder can be improved by diffusing EGR gas by the fins 40 while suppressing an increase in the pressure loss of intake air.

According to the first embodiment, as hereinabove described, the clearances 50 are provided between the fins 40 and the inner peripheral surface 12 of the throttle-side air intake pipe 1. Thus, the turbulent flow generated by the pressure difference between one surface side of the fins 40 and the other surface side can be generated not only in downstream ends of the fins 40 but also in the clearances 50 between the fins 40 and the inner peripheral surface 12 of the throttle-side air intake pipe 1, and hence diffusion of EGR gas can be further promoted.

According to the first embodiment, as hereinabove described, the fins 40 are provided to extend from the inside of the throttle-side air intake pipe 1 to the inside of the surge tank 2. Thus, diffusion of EGR gas to intake air from the throttle 20 is promoted by the fins 40 not only inside the throttle-side air intake pipe 1 but also inside the surge tank 2, and hence EGR gas can be further diffused to intake air from the throttle 20.

Second Embodiment

A second embodiment is now described with reference to FIGS. 3 and 9 to 14. In this second embodiment, an example of forming an air intake apparatus 200 for an internal combustion engine by incorporating a fin component 245 including fins 240, formed of a single resin molding into an air intake apparatus body 200a is described, unlike the air intake apparatus 100 (see FIG. 3) in which the fins 400 are directly formed in the throttle-side air intake pipe 1 according to the aforementioned first embodiment. The fins 240 are examples of the "gas distributivity improvement fin" in the present invention. In the figures, the same reference numerals as those in the aforementioned first embodiment are assigned to and show structures similar to those of the aforementioned first embodiment.

Figure 9:
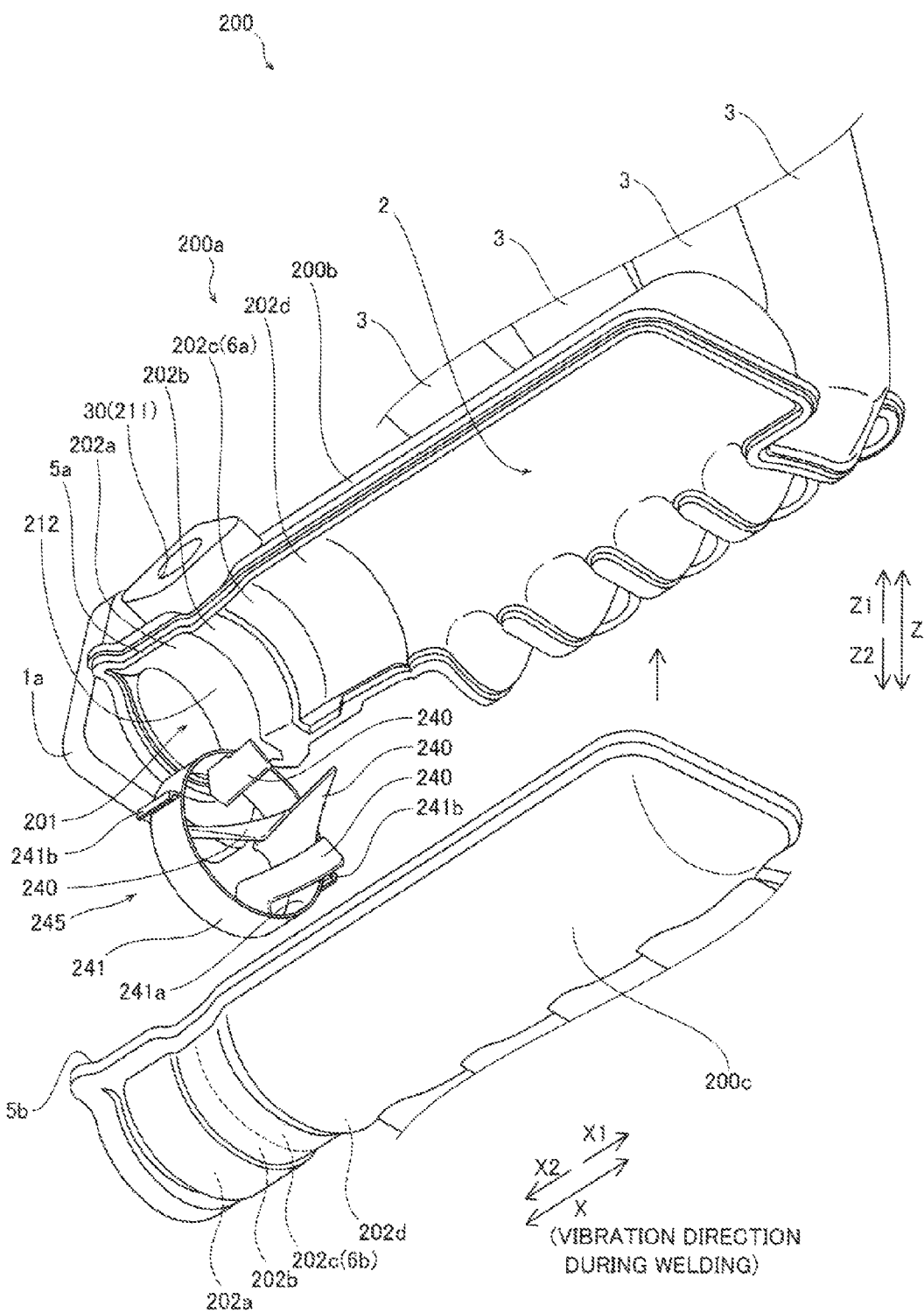
FIG. 9 An exploded perspective view showing the structure of an air intake apparatus according to a second embodiment of the present invention.

In the air intake apparatus 200 according to the second embodiment of the present invention, a bonding portion 5a and a bonding portion 5b are vibration welded to each other in a state where a first body portion 200b made of resin, having the bonding portion 5a and a second body portion 200c having the bonding portion 5b are opposed to each other, as shown in FIG. 9, whereby the air intake apparatus body 200a is formed. In a state where the air intake apparatus body 200a is formed, a throttle-side air intake pipe 201, a surge tank 2, and a plurality of air intake ports 3 are formed in this order in an internal space. The first body portion 200b and the second body portion 200c are examples of the "first air intake apparatus body portion" and the "second air intake apparatus body portion" in the present invention, respectively.

Figure 10:
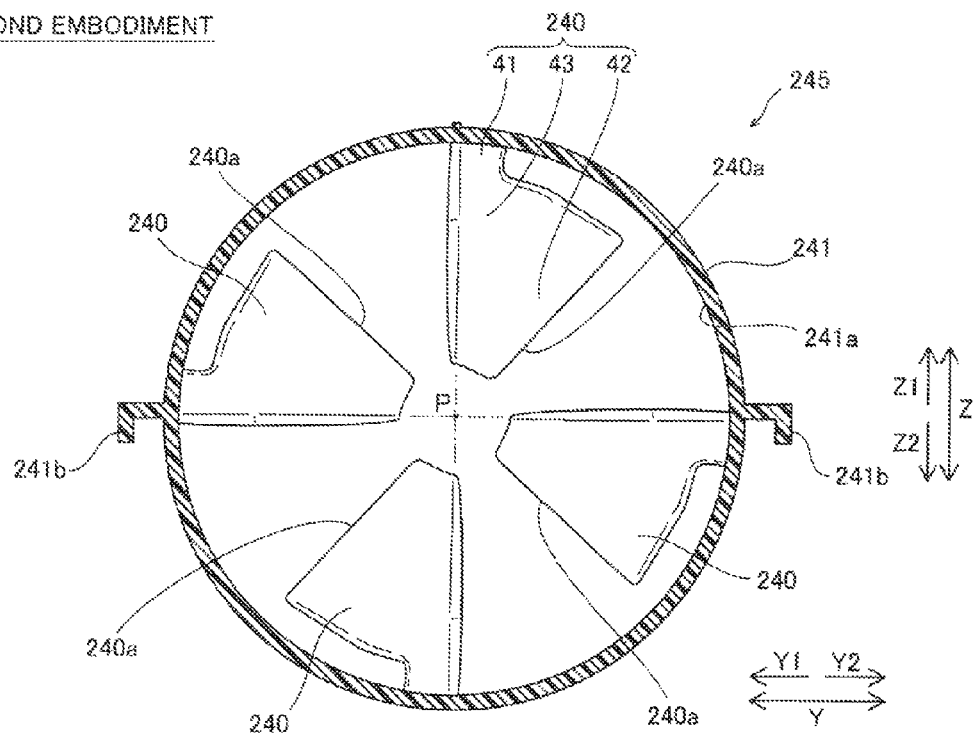
FIG. 10 A diagram of a fin member incorporated into the air intake apparatus according to the second embodiment of the present invention, as viewed along a central axis direction.
Figure 11:
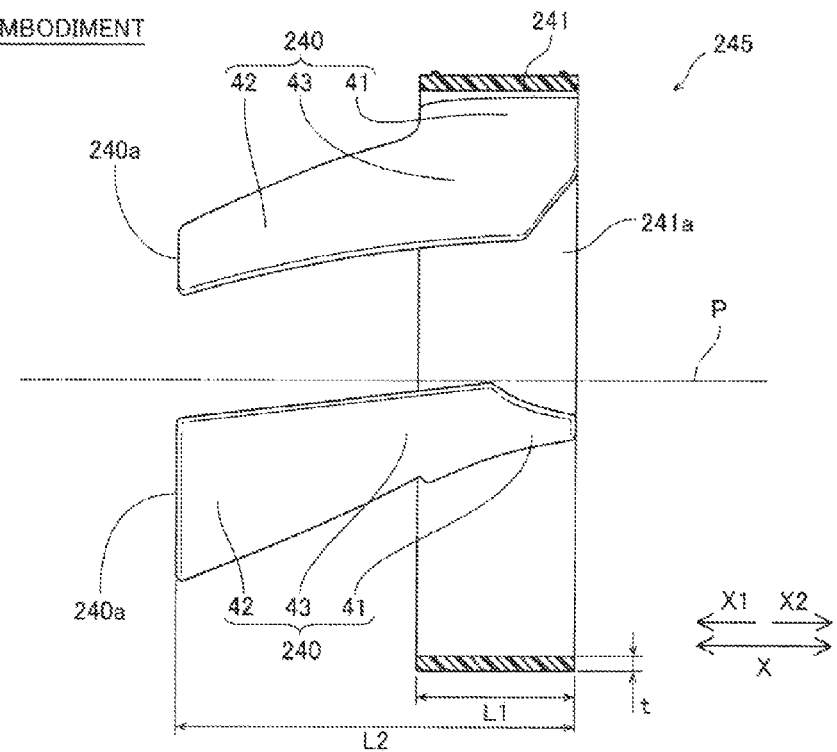
FIG. 11 A diagram of the fin member incorporated into the air intake apparatus according to the second embodiment of the present invention, as viewed from a side.

According to the second embodiment, at the time of forming the air intake apparatus body 200a, the bonding portion 5a and the bonding portion 5b are vibration welded to each other in a state where the fin component 245 as a separate component is held between the first body portion 200b and the second body portion 200c, whereby four fins 240 are arranged inside the throttle-side air intake pipe 201. The fin component 245 made of resin includes a cylindrical portion 241 having a prescribed thickness t and a length L1 (direction X) along a central axis P, annularly formed and the four fins 240 protruding inward in a radial direction from the inner peripheral surface 241a of the cylindrical portion 241 and thereafter twistedly extending while turning in a downstream direction (direction X2) along the central axis P, as shown in FIGS. 10 and 11. As shown in FIG. 11, front ends (X2 side) of the fins 240 are aligned with a front end of the cylindrical portion 241, which is an upstream side (X2 side). The cylindrical portion 241 has a tubular shape whose flow path sectional area is substantially constant along the central axis P, and the fin component 245 is obtained as an injection-molded article of thermoplastic resin. In this case, the inner peripheral surface 241a is formed with a draft angle of a mold in the range of about 1±0.5 degrees at the time of resin molding.

Figure 12:
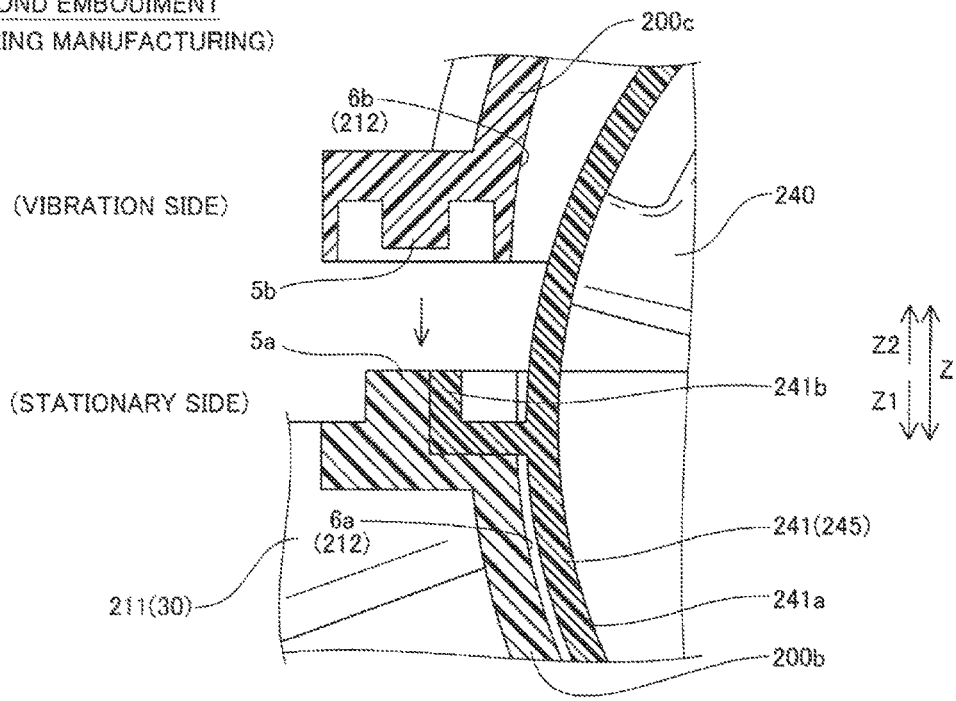
FIG. 12 A diagram for illustrating a step of mounting the fin member on an air intake apparatus body in the air intake apparatus according to the second embodiment of the present invention.
Figure 13:
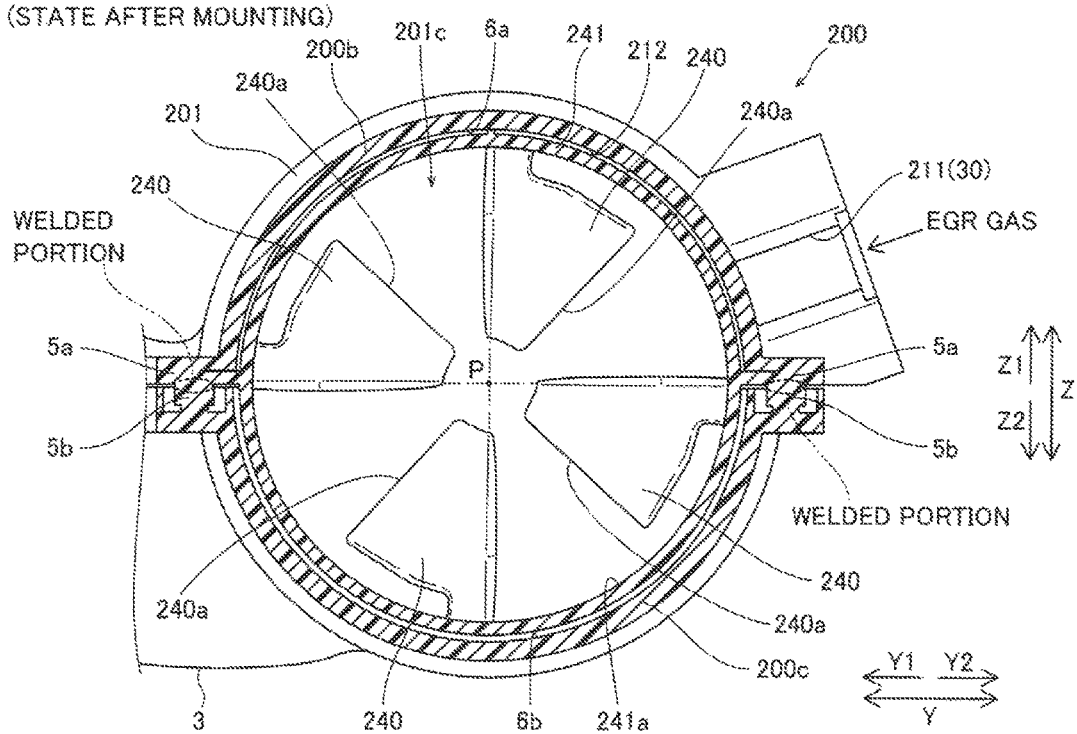
FIG. 13 A diagram showing a state where the fin member is mounted on the air intake apparatus body in the air intake apparatus according to the second embodiment of the present invention.

As shown in FIG. 10, protrusion portions 241b are provided in an outer peripheral portion of the cylindrical portion 241. The protrusion portions 241b each have a sectional shape (L-shape) protruding outward in the radial direction from the cylindrical portion 241 and thereafter orthogonally bending. The protrusion portions 241b each are in the form of a rib extending from one end (X1 side) of the cylindrical portion 241 to another end (X2 side) along the central axis P. As shown in FIGS. 9 and 12, in a vibration welding step, the first body portion 200b is covered with the second body portion 200c from above (Z2 side) in a state where the cylindrical portion 241 of the fin component 245 is placed on the first body portion 200b. The second body portion 200c, which is a vibration side (Z2 side), reciprocatively vibrates in the direction X along the central axis P with respect to the first body portion 200b, which is a stationary side (Z1 side). At this time, the bonding portion 5a and the bonding portion 5b are vibration welded to each other in a state where tip ends of the protrusion portions 241b of the fin component 245 are held between the bonding portion 5a of the first body portion 200b and the bonding portion 5b of the second body portion 200c. Consequently, the tip ends of the protrusion portions 241b, the bonding portion 5a, and the bonding portion 5b are welded to each other on a bonding surface to be integrated, as shown in FIG. 13, whereby the fin component 245 is tightly mounted on the first body portion 200b and the second body portion 200c. In elliptic regions shown by broken lines in FIG. 13, their resin materials are welded to each other to be integrated.

Figure 14:
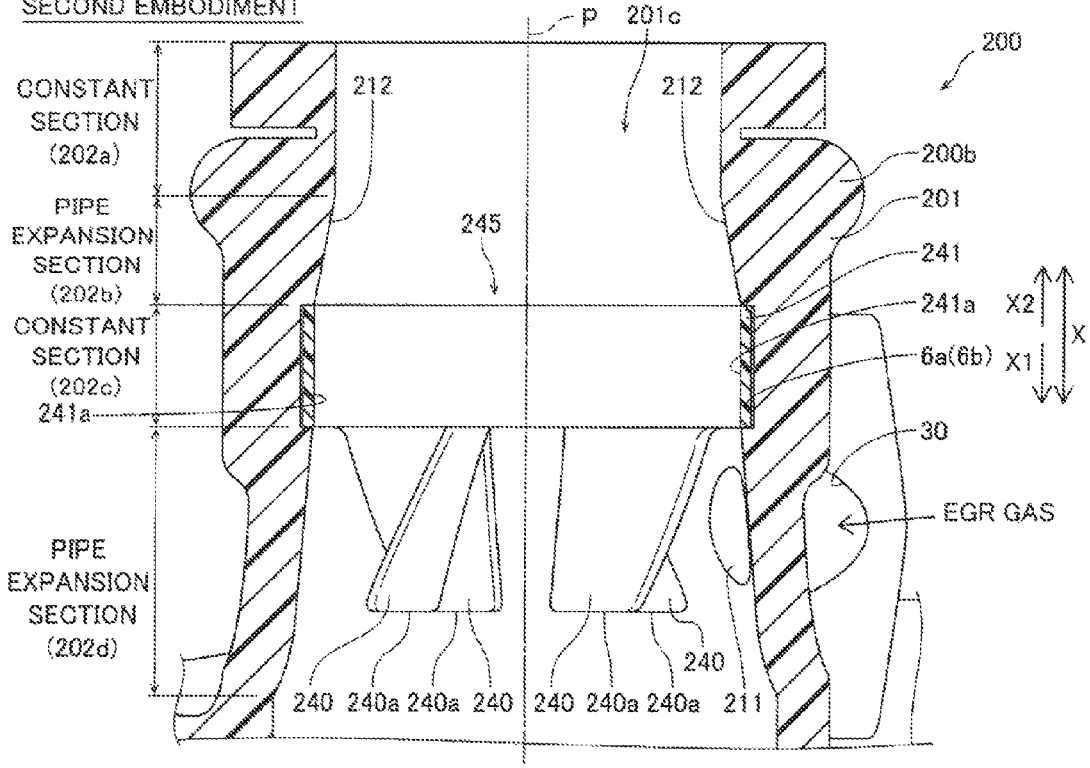
FIG. 14 A sectional view of the air intake apparatus according to the second embodiment of the present invention.

As shown in FIG. 9, portions of the first body portion 200b and the second body portion 200c between which the cylindrical portion 241 of the fin component 245 is held are formed with annular grooves 6a and 6b formed by excavating an inner peripheral surface 212 such that the cylindrical portion 241 can be embedded. The depth of the grooves 6a and 6b is larger by about 1 to 1.5 mm than the thickness t (see FIG. 11) of the cylindrical portion 241. Therefore, a small (at least about 0.5 mm and not more than about 1.5 mm) clearance is formed between the outer peripheral portion of the cylindrical portion 241 and the grooves 6a and 6b in a state where the fin component 245 is mounted on the air intake apparatus body 200a, as shown in FIG. 13. Note that this clearance is provided for absorbing a manufacturing error generated when the fin component 245 is vibration welded. As shown in FIG. 14, the inner peripheral surface 212 of the throttle-side air intake pipe 201 and the inner peripheral surface 241a of the cylindrical portion 241 are smoothly connected to each other in a state where the cylindrical portion 241 is embedded into the groove 6a (6b).

As shown in FIG. 11, the length L1 of the cylindrical portion 241 along the central axis P in the fin component 245 is smaller than the length L2 of the fins 240. The cylindrical portion 241 is provided on linear portions 41 of the fins 240, which are base portions on the X1 side (upstream side). The linear portions 41 are examples of the "upstream portion" in the present invention.

As shown in FIG. 14, the throttle-side air intake pipe 201 includes constant sections 202a and 202c in which the sectional area (inner diameter) of a flow path 201c is substantially constant (the draft angle of a mold at the time of resin molding is within the range of about 1±0.5 degrees) and pipe expansion sections 202b and 202d in which the sectional area (inner diameter) of the flow path 201c is gradually increased in the downstream direction (direction X2). The sectional area of the flow path 201c in the pipe expansion sections 202b and 202d is increased such that the inner peripheral surface 212 in the pipe expansion sections 202b and 202d has an inclination of 1.5 degrees or more with respect to the central axis P. According to the second embodiment, the pipe expansion section 202b is provided in a region in the vicinity of the cylindrical portion 241 on the upstream side of the cylindrical portion 241 of the fin component 245 along the central axis P of the throttle-side air intake pipe 201, and the flow path sectional area of the pipe expansion section 202b is larger than that of the constant section 202a on the upstream side. The pipe expansion section 202d is provided in a region on the downstream side of the cylindrical portion 241 of the fin component 245, in which the fins 240 are located, and the flow path sectional area of the pipe expansion section 202d is larger than that of the cylindrical portion 241. In order to provide the cylindrical portion 241 in a straight pipe shape (length L1) with an inner diameter determined on the basis of the size (shape) of the fins 240 in a portion of the throttle-side air intake pipe 201, the pipe expansion sections 202b and 202d are provided on the upstream side and the downstream side of the cylindrical portion 241, respectively. The pipe expansion sections 202b and 202d are examples of the "first pipe expansion portion" and the "second pipe expansion portion" in the present invention, respectively.

According to the second embodiment, an external gas inlet 211 is provided in the pipe expansion section 202d. Specifically, the external gas inlet 211 is provided on the upstream side (X1 side) of downstream ends 240a of the fins 240 and on the downstream side (X2 side) of the cylindrical portion 241 of the fin component 245 in a direction along the central axis P. Thus, EGR gas is efficiently mixed into swirl flow of intake air formed by the fins 240 arranged in a region corresponding to the pipe expansion section 202d.

The remaining structure of the air intake apparatus 200 according to the second embodiment is similar to that of the aforementioned first embodiment.

According to the second embodiment, as hereinabove described, the air intake apparatus 200 further includes the fin component 245 in which the cylindrical portion 241 constituting a part of the throttle-side air intake pipe 201 and the fins 240 are integrally provided and is formed by mounting the fin component 245 on the air intake apparatus body 200a. Thus, the fins 240 can be easily arranged inside the air intake apparatus body 200a by employing the fin component 245 in which the fins 240 are integrally provided in the cylindrical portion 241 constituting a part of the throttle-side air intake pipe 201.

According to the second embodiment, as hereinabove described, the air intake apparatus body 200a includes the first body portion 200b having a portion constituting the throttle-side air intake pipe 201 and the second body portion 200c, and the fin component 245 is mounted on the first body portion 200b and the second body portion 200c by holding the cylindrical portion 241 between the first body portion 200b and the second body portion 200c. Thus, the cylindrical portion 241 in the fin component 245 is held by the first body portion 200b and the second body portion 200c, and hence the fin component 245 can be easily fixed to a prescribed position inside the air intake apparatus body 200a.

According to the second embodiment, as hereinabove described, the cylindrical portion 241 of the fin component 245 includes the protrusion portions 241b provided in the outer peripheral portion of the cylindrical portion 241, and the fin component 245 is mounted on the first body portion 200b and the second body portion 200c by holding the protrusion portions 241b between a bonding surface of the first body portion 200b and a bonding surface of the second body portion 200c. Thus, the fin component 245 can be fixed to the inside of the air intake apparatus body 200a, utilizing the protrusion portions 241b provided in the outer peripheral portion of the cylindrical portion 241 opposite to the flow path 201c (inside) for intake air. Therefore, slip or position aberration of the entire fin component 245 in the flow path 201c resulting from generation of intake air pulsation or vibration of an engine 10 can be easily avoided.

According to the second embodiment, as hereinabove described, the bonding portion 5a of the first body portion 200b and the bonding portion 5b of the second body portion 200c are welded to each other in the state where the fin component 245 is held between the first body portion 200b and the second body portion 200c, and the protrusion portions 241b of the cylindrical portion 241 of the fin component 245 each are in the form of a rib welded to the bonding portion 5a of the first body portion 200b and the bonding portion 5b of the second body portion 200c. Thus, the bonding portions 5a and 5b can be easily welded to each other in a state where the protrusion portions 241b of the fin component 245 each in the form of a rib are held between the bonding portions 5a and 5b, and hence the fin component 245 that is a separate component at the time of assembly can be easily integrated with the air intake apparatus body 200a. Furthermore, in a step of weld-bonding the first body portion 200b and the second body portion 200c, the protrusion portions 241b of the fin component 245 each in the form of a rib can be welded simultaneously, and hence no step of mounting the fin component 245 may be provided separately. Consequently, even in the case where the fin component 245 is provided, the manufacturing process is not complicated.

According to the second embodiment, as hereinabove described, the portions of the first body portion 200b and the second body portion 200c between which the cylindrical portion 241 of the fin component 245 is held have the grooves 6a and 6b formed such that the cylindrical portion 241 can be embedded, and the inner peripheral surface 212 of the air intake apparatus body 200a and the inner peripheral surface 241a of the cylindrical portion 241 are connected to each other, having continuity in the state where the cylindrical portion 241 is embedded into the grooves 6a and 6b. Thus, the fin component 245 can be reliably arranged at the prescribed position inside the air intake apparatus body 200a, utilizing a fitting state between the cylindrical portion 241 of the fin component 245 and both the groove 6a formed in the first body portion 200b and the groove 6b formed in the second body portion 200c. Furthermore, the inner peripheral surface 212 of the air intake apparatus body 200a and the inner peripheral surface 241a of the cylindrical portion 241 are smoothly connected to each other, and hence an increase in the circulation resistance of intake air resulting from the embedment of the cylindrical portion 241 can be reliably avoided.

According to the second embodiment, as hereinabove described, the length L1 of the cylindrical portion 241 of the fin component 245 is smaller than the length L2 of the fins 240 in the direction along the central axis P of the throttle-side air intake pipe 201. Thus, the area of the fins 240 mounted on the air intake apparatus body 200a (the first body portion 200b and the second body portion 200c) can be further reduced within a range where the fin component 245 can be mounted while sufficiently ensuring the length L2 of the fins 240 and maintaining the distribution accuracy of EGR gas to each air intake port 3.

According to the second embodiment, as hereinabove described, the cylindrical portion 241 of the fin component 245 is provided on the linear portions 41 of the fins 240 on the upstream side in the direction along the central axis P of the throttle-side air intake pipe 201. Thus, downstream portions (spiral portions 42 and coupling portions 43) of the fins 240 in the fin component 245 each can be formed in an intended shape. Furthermore, in order to promote diffusion of EGR gas to intake air from the throttle 20 by the fins 240, in addition to the spiral portions 42 and the coupling portions 43 of the fins 240 on the downstream side, the inner peripheral surface 212 of the throttle-side air intake pipe 201 around the fins 240 can be formed in a shape optimum for reducing pressure loss in correspondence to the shape of the fins 240.

According to the second embodiment, as hereinabove described, the external gas inlet 211 is provided in a region of the throttle-side air intake pipe 201 upstream of the downstream ends 240a of the fins 240 in the direction along the central axis P of the throttle-side air intake pipe 201. Thus, EGR gas introduced from the external gas inlet 211 can be promptly merged (mixed) into swirl flow of intake air formed by the fins 240 to promote diffusion of EGR gas to intake air.

According to the second embodiment, as hereinabove described, the external gas inlet 211 is provided on the upstream side (X1 side) of the downstream ends 240a of the fins 240 and on the downstream side (X2 side) of the cylindrical portion 241 of the fin component 245 in the direction along the central axis P of the throttle-side air intake pipe 201. Thus, the external gas inlet 211 can be distanced from the throttle 20 located on the upstream side of the cylindrical portion 241, and hence attachment of deposit on the throttle 20 following introduction of EGR gas and malfunction of the throttle 20 can be avoided while promoting diffusion of EGR gas to intake air.

According to the second embodiment, as hereinabove described, the throttle-side air intake pipe 201 includes the pipe expansion section 202b provided in the region in the vicinity of the cylindrical portion 241 on the upstream side of the cylindrical portion 241 of the fin component 245 in the direction along the central axis P, whose flow path sectional area is larger than that of the portion on the upstream side and the pipe expansion section 202d provided in the region on the downstream side of the cylindrical portion 241 of the fin component 245 in the direction along the central axis P, in which the fins 240 are located, whose flow path sectional area is larger than that of the cylindrical portion 241. Thus, a reduction in the flow path sectional area resulting from providing the fins 240 can be compensated by an increase in the flow path sectional area by the pipe expansion section 202b and the pipe expansion section 202d, and hence the flow path sectional area not generating the pressure loss of intake air can be ensured in the throttle-side air intake pipe 201 even in the case where the fins 240 are provided.

According to the second embodiment, as hereinabove described, the external gas inlet 211 is provided in the pipe expansion section 202d. Thus, EGR gas can be directly merged into agitation flow (swirl flow) of intake air formed by the fins 240 arranged in the region corresponding to the pipe expansion section 202d, and hence diffusion (mixing) of EGR gas to intake air can be effectively promoted. The remaining effects of the second embodiment are similar to those of the aforementioned first embodiment.

Third Embodiment

A third embodiment is described with reference to FIGS. 9, 15, and 16. In this third embodiment, an example of fixing a fin component 345 to the inside of an air intake apparatus body 300a by pressing a cylindrical portion 341 made of resin, formed to generate elastic force into annular grooves 6a and 6b (see FIG. 9) at the time of assembly is described, unlike the aforementioned second embodiment. In the figures, the same reference numerals as those in the second embodiment are assigned to and show structures similar to those of the aforementioned second embodiment.

Figure 15:
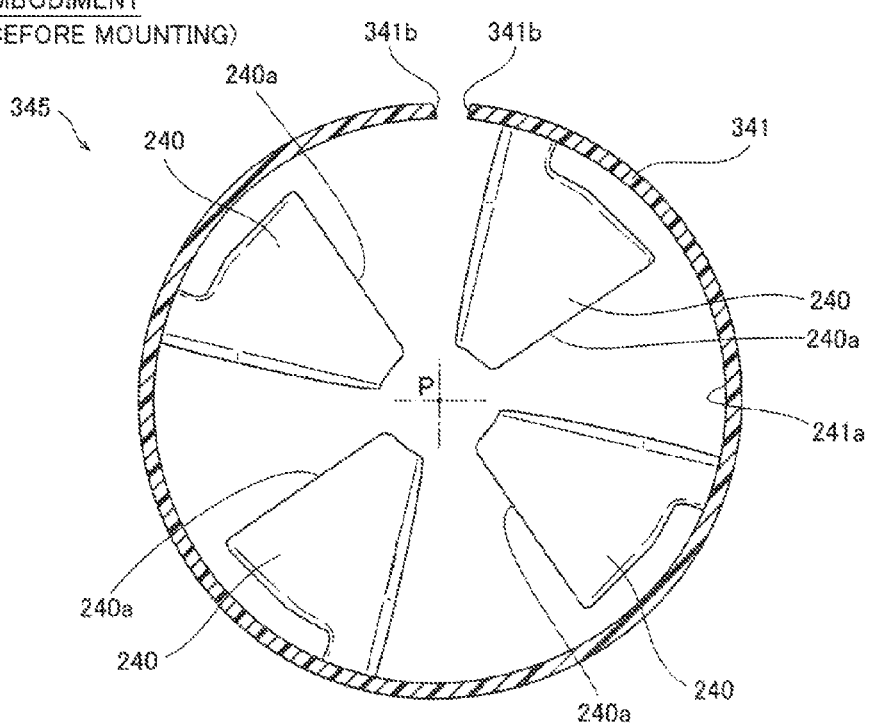
FIG. 15 A diagram of a fin member incorporated into an air intake apparatus according to a third embodiment of the present invention, as viewed along a central axis direction.
Figure 16:
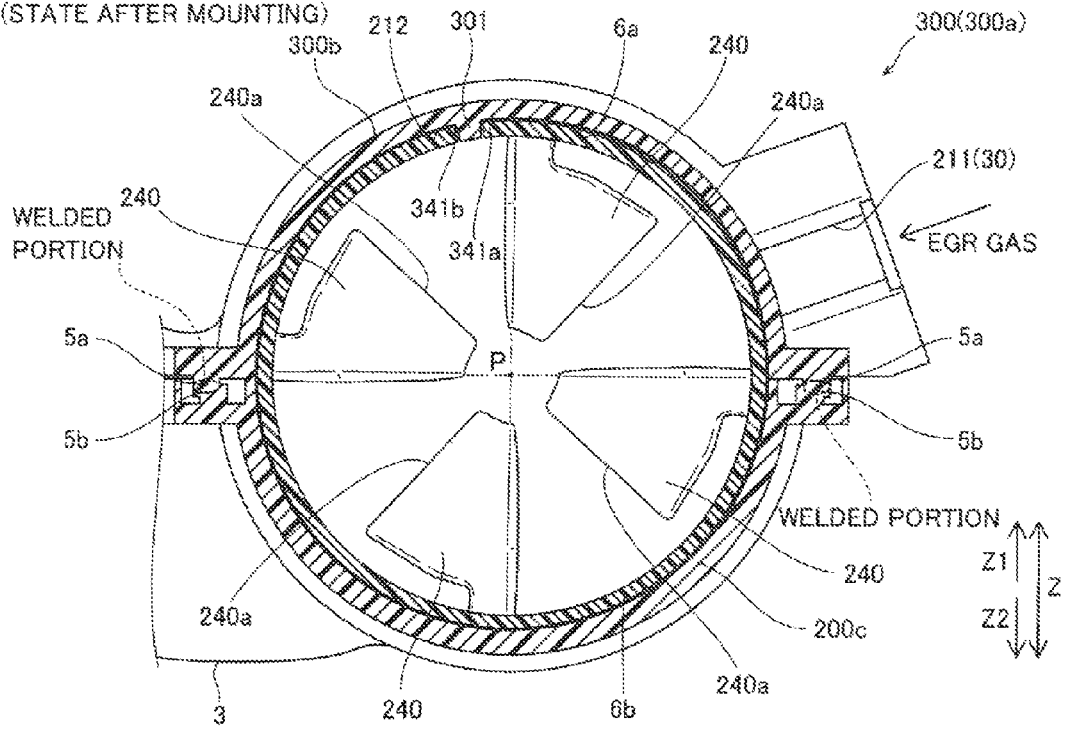
FIG. 16 A diagram showing a state where the fin member is mounted on an air intake apparatus body in the air intake apparatus according to the third embodiment of the present invention.

In an air intake apparatus 300 for an internal combustion engine according to the third embodiment of the present invention, the cylindrical portion 341 of the fin component 345 has ends 341a and 341b formed by partially cutting off a circular ring, as shown in FIG. 15. The ends 341a and 341b extend from one end of the cylindrical portion 341 to another end along a central axis P. In a state where the fin component 345 is separate, the outer shape (natural state) of the cylindrical portion 341 is larger than the inner diameter of the grooves 6a and 6b (see FIG. 9) into which the cylindrical portion 341 is fitted in the case where the air intake apparatus body 300a is formed by vibration welding. Therefore, as shown in FIG. 16, the cylindrical portion 341 is pressed into the groove 6a (6b) in a state where the outer shape of the cylindrical portion 341 is compressed (diameter reduction state), whereby the fin component 345 is held inside the air intake apparatus body 300a, utilizing urging force that tends to spread the cylindrical portion 341 outward in a radial direction. In this case, an outer peripheral portion of the cylindrical portion 341 is in surface contact with the grooves 6a and 6b of the cylindrical portion 341. Thus, the fin component 345 is held inside the air intake apparatus body 300a without slip of the cylindrical portion 341.

A bottom portion of the groove 6a formed in a first body portion 300b is formed with a single rib 301 whose cross-section protrudes inward in the radial direction, extending in a direction X. Therefore, in a state where the cylindrical portion 341 is pressed into the grooves 6a and 6b, the ends 341a and 341b of the cylindrical portion 341 come into contact with a side wall of the rib 301 from the right and left sides. Thus, the cylindrical portion 341 is reliably fixed to (held at) the same position without pivoting about the central axis P inside the air intake apparatus body 300a.

The remaining structure of the air intake apparatus 300 according to the third embodiment is similar to that according to the aforementioned second embodiment.

According to the third embodiment, as hereinabove described, the cylindrical portion 341 having the ends 341a and 341b is pressed into the grooves 6a and 6b to fix the fin component 345 to the inside of the air intake apparatus body 300a. Thus, the fin component 345 can be easily mounted on the inside of the air intake apparatus body 300a without forming the protrusion portions 241b on the outer peripheral portion of the cylindrical portion 241 as in the fin component 245 according to the aforementioned second embodiment. Furthermore, no protrusion portion 241b is required, and hence the structure of the cylindrical portion 341 is simplified. Thus, the fin component 345 can be more easily manufactured. The remaining effects of the third embodiment are similar to those of the aforementioned second embodiment.

Fourth Embodiment

A fourth embodiment is described with reference to FIGS. 13 and 17 to 19. In this fourth embodiment, an example of crank-shaping a flow path 590 of the EGR gas pipe 530 in a portion thereof connected to a throttle-side air intake pipe 501 is described, unlike the aforementioned second embodiment in which the EGR gas pipe 30 is connected to a portion of the throttle-side air intake pipe 201 (see FIG. 13) in a state where the same is kept straight. The EGR gas pipe 530 is an example of the "external gas pipe" in the present invention. In the figures, the same reference numerals as those in the second embodiment are assigned to and show structures similar to those of the aforementioned second embodiment.

Figure 17:
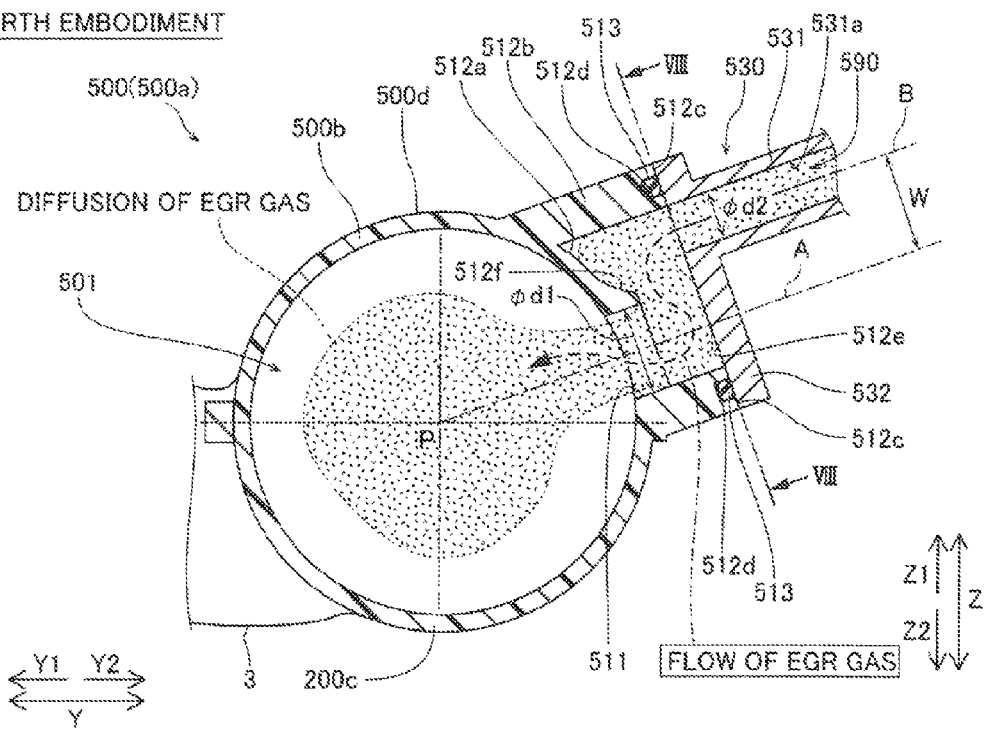
FIG. 17 A sectional view showing the structure of an EGR gas pipe connected to an air intake apparatus body in an air intake apparatus according to a fourth embodiment of the present invention.

An air intake apparatus 500 for an internal combustion engine according to the fourth embedment of the present invention includes an air intake apparatus body 500a in which a first body portion 500b and a second body portion 200c are opposed and bonded to each other, as shown in FIG. 17. An external gas inlet 511 for introducing EGR gas is provided in a portion of the first body portion 500b corresponding to the throttle-side air intake pipe 501. The first body portion 500b is an example of the "first air intake apparatus body portion" in the present invention.

Figure 18:
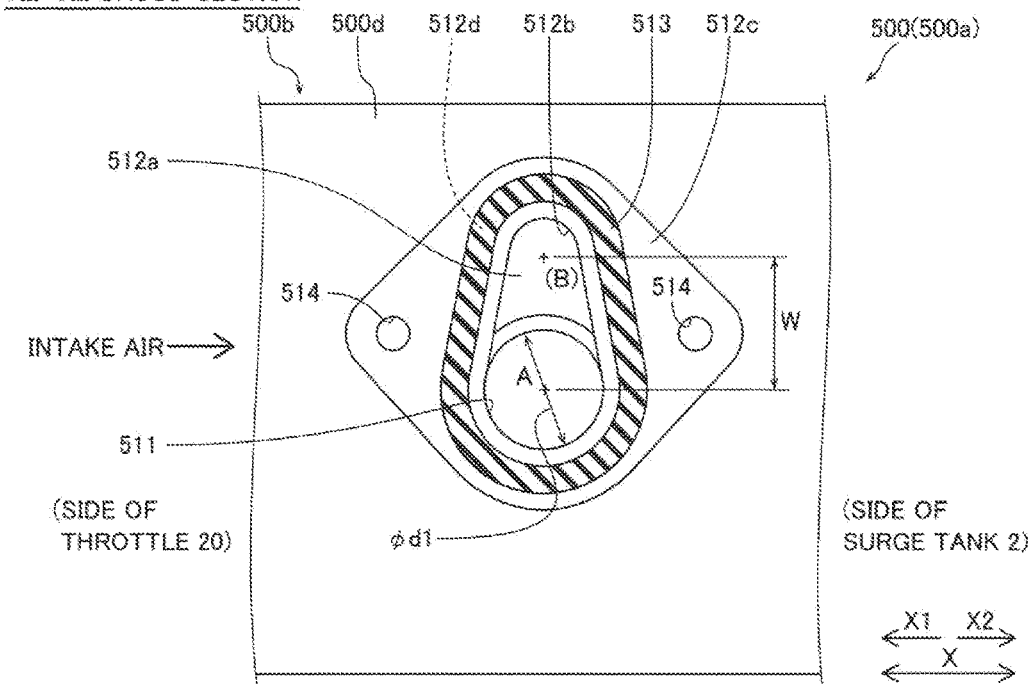
FIG. 18 A sectional view taken along the line VIII-VIII in FIG. 17 as viewed from the side of the air intake apparatus body.
Figure 19:
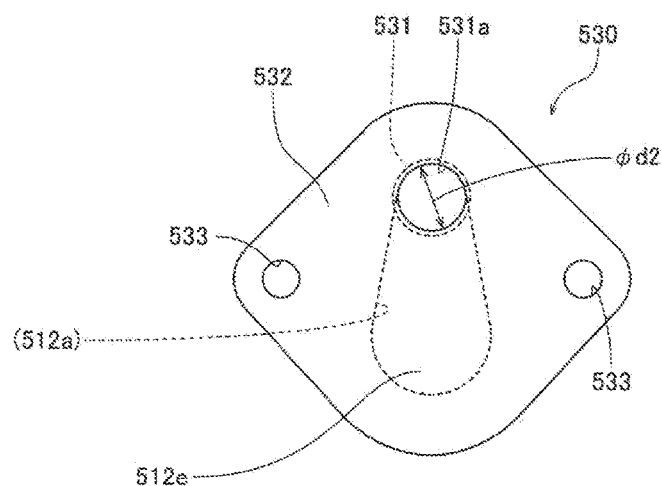
FIG. 19 A sectional view taken along the line VIII-VIII in FIG. 17 as viewed from the side of the EGR gas pipe connected to the air intake apparatus body.

According to the fourth embodiment, an EGR gas pipe connection portion 512 having a prescribed shape is integrally formed on the outer surface 500d of the first body portion 500b around the external gas inlet 511. This EGR gas pipe connection portion 512 has a bottom portion 512a having an opening (inner diameter d1) connected to the external gas inlet 511 and a peripheral wall portion 512b surrounding the circumference of the bottom portion 512a. As shown in FIG. 18, an end surface 512c (the front side of the plane of the figure) of the peripheral wall portion 512b formed circumferentially (in a frame shape) is formed with an annular groove 512d (see FIG. 17), and a sealing member 513 such as a gasket is fitted thereinto. The EGR gas pipe connection portion 512 is directed obliquely upward with respect to a horizontal plane as a whole. The end surface 512c is formed with a pair of fixing holes 514 having thread grooves outside the groove 512d.

As shown in FIG. 17, the EGR gas pipe 530 provided with a flange portion 532 on one end of a pipe portion 531 is mounted obliquely downward from above while bringing the flange portion 532 into contact with the end surface 512c of the EGR gas pipe connection portion 512. The flange portion 532 is formed with a pair of insertion holes 533 (see FIG. 19), and fastening bolts (not shown) are inserted into the insertion holes 533 to be fastened into the fixing holes 514 of the EGR gas pipe connection portion 512. In a state where the EGR gas pipe 530 is mounted on the EGR gas pipe connection portion 512, a ceiling portion 512e is formed of the inner surface of the flange portion 532 serving as a lid, opposite to the bottom portion 512a, and the EGR gas pipe connection portion 512 is formed in a container shape. The EGR gas pipe connection portion 512 is an example of the "offset portion" in the present invention.

According to the fourth embodiment, the EGR gas pipe connection portion 512 is provided in a connection between the throttle-side air intake pipe 501 formed with the external gas inlet 511 and the EGR gas pipe 530, whereby a central axis A of the external gas inlet 511 and a central axis B of the EGR gas pipe 530 (pipe portion 531) are offset with respect to each other at an interval W. The interval W is set to such a degree that the external gas inlet 511 and the inner surface 531a of the pipe portion 531 having an inner diameter d2 do not overlap each other in a plan view. Therefore, the flow path 590 from the EGR gas pipe 530 to the external gas inlet 511 is crank-shaped in the EGR gas pipe connection portion 512. The inner diameter d1 (see FIG. 18) of the external gas inlet 511 passing through the bottom portion 512a of the EGR gas pipe connection portion 512 is larger than the inner diameter d2 (see FIG. 19) of the EGR gas pipe 530.

Thus, EGR gas circulating in the EGR gas pipe 530 hits the bottom portion 512a of the EGR gas pipe connection portion 512 that is an extension of the central axis B and is reduced in flow velocity, and thereafter flows along the bottom portion 512a (ceiling portion 512e) in the EGR gas pipe connection portion 512, as shown in FIG. 17. The EGR gas whose flow velocity is reduced is introduced into the throttle-side air intake pipe 501 through the opening (inner diameter d1) on the side of the external gas inlet 511 whose central axis A is offset at the interval W with respect to the central axis B in the bottom portion 512a. At this time, the inner diameter d1 of the external gas inlet 511 is larger than the inner diameter d2 of the pipe portion 531 of the EGR gas pipe 530, and hence the EGR gas is introduced into the throttle-side air intake pipe 501 in a state where the flow velocity is kept reduced in the EGR gas pipe connection portion 512. Therefore, EGR gas is sufficiently mixed (diffused) into intake air from a throttle 20 without jetting in an extremely jet state and flowing downstream (toward a surge tank 2) while remaining unevenly distributed in the vicinity of an inner wall of the throttle-side air intake pipe 501 opposite to the external gas inlet 511. Furthermore, due to the synergistic effect with gas distributivity improvement fins 240 arranged in the vicinity of the external gas inlet 511, the mixing rate (EGR rate) of EGR gas contained in intake air distributed to each air intake port 3 (see FIG. 17) is further equalized between air intake ports 3.

As shown in FIG. 18, the inner surface of the peripheral wall portion 512b of the EGR gas pipe connection portion 512 has such an inner wall surface shape that the arcuate inner surface shape of the pipe portion 531 (see FIG. 19) of the EGR gas pipe 530 and the arcuate inner surface shape of the external gas inlet 511 are connected by a pair of tangents. Therefore, EGR gas flows into the external gas inlet 511 without excessively increasing the volume of the EGR gas pipe connection portion 512 and without stagnation of EGR gas that hits the bottom portion 512a. The diameter (flow path volume (flow path sectional area)) of the pipe portion 531 is also reduced to a required minimum, and hence the responsiveness of circulation amount control including circulation and non-circulation of EGR gas is also excellent.

As shown in FIG. 17, the bottom portion 512a of the EGR gas pipe connection portion 512 has an inclined surface 512f extending obliquely downward from the peripheral wall portion 512b toward the external gas inlet 511. Therefore, even if EGR gas flowing into the EGR gas pipe connection portion 512 hits the bottom portion 512a to generate condensed water, this condensed water flows down the inclined surface 512f obliquely downward without accumulating in the bottom portion 512a and is sucked into the external gas inlet 511.

The remaining structure of the air intake apparatus 500 according to the fourth embodiment is similar to that according to the aforementioned second embodiment.

According to the fourth embodiment, as hereinabove described, the air intake apparatus 500 further includes the EGR gas pipe 530 connected to the external gas inlet 511, supplying EGR gas to the external gas inlet 511, and the EGR gas pipe connection portion 512 in which the central axis A of the external gas inlet 511 and the central axis B of the EGR gas pipe 530 are offset with respect to each other is provided. Thus, the EGR gas pipe connection portion 512 can generate flow path resistance in the flow of EGR gas circulating in the flow path 590 (EGR gas pipe 530) to reduce the flow velocity of the EGR gas before the external gas inlet 511. In other words, it is undesirable to introduce EGR gas into intake air at a flow velocity exceeding the optimum flow velocity of EGR gas (the flow velocity of external gas) for a fin component 245 (fins 240) when introducing a larger amount of EGR gas in order to improve the specific fuel consumption of a multi-cylinder engine 10. In this case, the flow path 590 in which the EGR gas pipe 530 and the external gas inlet 511 are offset with each other at the interval W is formed, whereby the flow velocity of EGR gas can be reduced, and hence EGR gas is introduced into the throttle-side air intake pipe 501 in a state where the flow velocity of EGR gas is reduced. Thus, EGR gas can be sufficiently diffused into intake air from the throttle 20. Therefore, the synergistic effect with the gas distributivity improvement fins 240 can be obtained to further improve the distributivity accuracy of EGR gas to each cylinder.

According to the fourth embodiment, as hereinabove described, in the structure provided with the EGR gas pipe connection portion 512, the inner diameter d1 of the external gas inlet 511 is larger than the inner diameter d2 of the EGR gas pipe 530 (pipe portion 531). Thus, while EGR gas circulates in the EGR gas pipe 530 and reaches the external gas inlet 511, the inner diameter of the flow path 590 is increased thereby increasing the flow path sectional area, and hence in addition to a reduction in the flow velocity of EGR gas by the EGR gas pipe connection portion 512, the flow velocity of EGR gas in the external gas inlet 511 can be reliably reduced. Furthermore, the inner diameter d2 of the EGR gas pipe 530 (pipe portion 531) can be smaller as compared with that of the external gas inlet 511 to reduce the piping volume, and hence the responsiveness of the air intake apparatus 500 during transient control can be improved.

According to the fourth embodiment, as hereinabove described, the EGR gas pipe connection portion 512 is formed in the connection between the throttle-side air intake pipe 501 (first body portion 500b) provided with the external gas inlet 511 and the EGR gas pipe 530. Thus, the EGR gas pipe connection portion 512 is arranged close to the throttle-side air intake pipe 501, and hence the flow path length (the flow path length along the central axis A) from the EGR gas pipe connection portion 512 to the external gas inlet 511 on a downstream side can be reduced as much as possible. Therefore, the flow path volume from the EGR gas pipe connection portion 512 to the external gas inlet 511 can be reduced, and hence the responsiveness of the air intake apparatus 500 during transient control can be improved.

According to the fourth embodiment, as hereinabove described, the EGR gas pipe connection portion 512 having the peripheral wall portion 512b and the groove 512d is integrally formed on the outer surface 500d of the first body portion 500b, and the EGR gas pipe 530 is mounted on the EGR gas pipe connection portion 512 while bringing the flange portion 532 into contact with the end surface 512c of the peripheral wall portion 512b. Thus, in the manufacturing process, the external gas inlet 511 of the first body portion 500b and a portion of the EGR gas pipe connection portion 512 including the groove 512d can be easily molded without undercut treatment using a slide die of the same direction. The remaining effects of the fourth embodiment are similar to those of the aforementioned second embodiment.

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while the example of applying the air intake apparatus for an internal combustion engine according to the present invention to the automotive multi-cylinder engine has been shown in each of the aforementioned first to fourth embodiments, the present invention is not restricted to this. The air intake apparatus for an internal combustion engine according to the present invention may be applied to an engine other than the automotive engine.

While the example of providing the four fins (gas distributivity improvement fins) inside the throttle-side air intake pipe has been shown in each of the aforementioned first to fourth embodiments, the present invention is not restricted to this. According to the present invention, as in an air intake apparatus 600 according to a first modification of the first embodiment shown in FIG. 20, three fins 40 (gas distributivity improvement fins) may be provided, or a plurality of gas distributivity improvement fins other than three and four may be provided. Alternatively, one gas distributivity improvement fin may be provided. This structure in which the number of gas distributivity improvement fins is changed can be similarly applied to not only the air intake apparatus 600 according to the aforementioned first modification but also the air intake apparatus 200 according to the aforementioned second embodiment, the air intake apparatus 300 according to the aforementioned third embodiment, and the air intake apparatus 500 according to the aforementioned fourth embodiment.

While the example of providing the external gas inlet in the inner peripheral surface of the throttle-side air intake pipe and introducing EGR gas (external gas) into the throttle-side air intake pipe has been shown in each of the aforementioned first to fourth embodiments, the present invention is not restricted to this. According to the present invention, the external gas inlet may be provided in the inner peripheral surface of the surge tank, and external gas may be introduced into the surge tank. Alternatively, external gas may be introduced into both the throttle-side air intake pipe and the surge tank.

While the example of providing the external gas inlet 211 on the upstream side (X1 side) of the downstream ends 240a of the fins 240 and on the downstream side (X2 side) of the cylindrical portion 241 of the fin component 245 has been shown in each of the aforementioned second and third embodiments, the present invention is not restricted to this. According to the present invention, the external gas inlet may be provided at a position overlapping with the cylindrical portion or may be provided on the downstream side of the throttle 200 and on the upstream side of the cylindrical portion (a portion corresponding to the negative pressure turbulent flow region).

While the example of providing the fins (gas distributivity improvement fins) to stride both the throttle-side air intake pipe corresponding to the external gas inlet and the surge tank has been shown in each of the aforementioned first to fourth embodiments, the present invention is not restricted to this. According to the present invention, the gas distributivity improvement fins may be provided only inside the throttle-side air intake pipe corresponding to the external gas inlet or may be provided only inside the surge tank corresponding to the external gas inlet.

While the example of providing the single external gas inlet inside the throttle-side air intake pipe has been shown in each of the aforementioned first to fourth embodiments, the present invention is not restricted to this. According to the present invention, as in an air intake apparatus 700 according to a second modification of the first embodiment shown in FIG. 21, an EGR gas pipe 730 may be branched into a fork, and two external gas inlets 711a and 711b may be provided inside a throttle-side air intake pipe. Alternatively, three or more external gas inlets may be provided. This structure in which the number of external gas inlets is changed can be similarly applied to not only the air intake apparatus 700 according to the aforementioned second modification but also the air intake apparatus 200 according to the aforementioned second embodiment, the air intake apparatus 300 according to the aforementioned third embodiment, and the air intake apparatus 500 according to the aforementioned fourth embodiment.

While EGR gas has been shown as the example of the external gas according to the present invention in each of the aforementioned first to fourth embodiments, the present invention is not restricted to this. According to the present invention, external gas other than EGR gas, such as blow-by gas or evaporative fuel gas (evaporation gas) generated in a fuel tank may be employed, for example. Alternatively, not only one type of external gas but also a plurality of types of external gas may be introduced into at least one of the throttle-side air intake pipe and the surge tank.

While the example in which the fins (gas distributivity improvement fins) have the linear portions linearly extending downstream of intake air, the spiral portions spirally twisted downstream of intake air, and the coupling portions coupling the linear portions and the spiral portions has been shown in each of the aforementioned first to fourth embodiments, the present invention is not restricted to this. According to the present invention, the gas distributivity improvement fins may not have the spiral portions spirally twisted but may have only the linear portions linearly extending downstream of intake air, or the gas distributivity improvement fins may not have the linear portions linearly extending but may have only the spiral portions spirally twisted downstream of intake air.

While the example of forming the end sides 413 (see FIGS. 3 and 8) of the fins (gas distributivity improvement fins) on the upstream side (X1 side) of the spiral portions 42 has been shown in the aforementioned first embodiment, the present invention is not restricted to this. According to the present invention, as in an air intake apparatus 800 according to a third modification of the first embodiment shown in FIG. 22, end sides 813a of fins 840 may be formed on an upstream side along an outer edge of a negative pressure turbulent flow region. In this case, the fins 840 can more smoothly guide external gas to the negative pressure turbulent flow region, and hence diffusion of external gas can be further promoted.

While the example of forming the four fins (gas distributivity improvement fins) in the same shape as each other has been shown in each of the aforementioned first to fourth embodiments, the present invention is not restricted to this. According to the present invention, a plurality of gas distributivity improvement fins may be formed in different shapes from each other according to the arrangement positions thereof.

While the example of forming the EGR gas pipe connection portion 512 in the first body portion 500b of the air intake apparatus body 500a has been shown in the aforementioned fourth embodiment, the present invention is not restricted to this. According to the present invention, the EGR gas pipe connection portion 512 may be formed in a connection between the surge tank 2 and the external gas pipe (EGR gas pipe) in the case where the external gas inlet is provided in the surge tank 2.

REFERENCE NUMERALS 1, 201, 501: throttle-side air intake pipe
1a: one end
1b: another end
1c, 201c: flow path
2: surge tank
6a, 6b: groove
10: engine (internal combustion engine)
11, 211, 511: external gas inlet
12, 212: inner peripheral surface
20: throttle
40, 240: fin (gas distributivity improvement fin)
41: linear portion (upstream portion)
42: spiral portion
50: clearance
100, 200, 300, 400, 500, 600, 700, 800: air intake apparatus for an internal combustion engine
100a, 200a, 300a, 500a: air intake apparatus body
200b, 500b: first body portion (first air intake apparatus body portion)
200c: second body portion (second air intake apparatus body portion)
202b: pipe expansion section (first pipe expansion portion)
202d: pipe expansion section (second pipe expansion portion)
240a: downstream end
241: cylindrical portion
241a: inner peripheral surface
241b: protrusion portion
245, 345: fin component
512: EGR gas pipe connection portion (offset portion)
512a: bottom portion
512b: peripheral wall portion
530: EGR gas pipe (external gas pipe)
531: pipe portion
532: flange portion

The invention claimed is:
1. An air intake apparatus for an internal combustion engine, comprising:
a throttle-side air intake pipe having one end connected to a throttle and another end connected to a surge tank;
an external gas inlet provided in at least one of the throttle-side air intake pipe and the surge tank, introducing external gas into at least one of the throttle-side air intake pipe and the surge tank; and
a gas distributivity improvement fin provided inside at least one of the throttle-side air intake pipe and the surge tank, which corresponds to the external gas inlet, diffusing the external gas to intake air from the throttle, wherein
a plurality of the gas distributivity improvement fins are provided inside the throttle-side air intake pipe, the plurality of gas distributivity improvement fins are arranged in a state where the same are divided radially from a center of a flow path cross-section of the throttle-side air intake pipe, and the plurality of gas distributivity improvement fins are not provided in a central portion of the flow path cross-section of the throttle-side air intake pipe but are provided on an inner peripheral surface side of the throttle-side air intake pipe, and
a portion of the throttle-side air intake pipe provided with the gas distributivity improvement fins is larger in flow path sectional area than a portion on an upstream side of the portion of the throttle-side air intake pipe provided with the gas distributivity improvement fins.

2. The air intake apparatus for an internal combustion engine according to claim 1, wherein the gas distributivity improvement fin extends downstream in a flow direction of the intake air.

3. The air intake apparatus for an internal combustion engine according to claim 2, wherein the gas distributivity improvement fin includes a portion extending downstream in the flow direction of the intake air, spirally twisted.

4. The air intake apparatus for an internal combustion engine according to claim 1, wherein the gas distributivity improvement fin is arranged in a vicinity of a negative pressure turbulent flow region generated downstream of the throttle in a half-open state of the throttle.

5. The air intake apparatus for an internal combustion engine according to claim 1, wherein the external gas inlet is provided between the plurality of gas distributivity improvement fins.

6. The air intake apparatus for an internal combustion engine according to claim 1, further comprising a fin component in which a cylindrical portion constituting a part of the throttle-side air intake pipe and the gas distributivity improvement fin are integrally provided, and wherein the fin component is mounted on an air intake apparatus body.

7. The air intake apparatus for an internal combustion engine according to claim 6, wherein the air intake apparatus body includes a first air intake apparatus body portion and a second air intake apparatus body portion having portions constituting the throttle-side air intake pipe, and
the fin component is mounted on the first air intake apparatus body portion and the second air intake apparatus body portion by holding the cylindrical portion of the fin component between the first air intake apparatus body portion and the second air intake apparatus body portion.

8. The air intake apparatus for an internal combustion engine according to claim 6, wherein a length of the cylindrical portion of the fin component is smaller than a length of the gas distributivity improvement fin in a central axis direction of the throttle-side air intake pipe, and the cylindrical portion of the fin component is provided in an upstream portion of the gas distributivity improvement fin in the central axis direction of the throttle-side air intake pipe.

9. The air intake apparatus for an internal combustion engine according to claim 6, wherein the external gas inlet is provided in a region of the throttle-side air intake pipe upstream of a downstream end of the gas distributivity improvement fin in a central axis direction of the throttle-side air intake pipe, and the external gas inlet is provided upstream of the downstream end of the gas distributivity improvement fin and downstream of the cylindrical portion of the fin component in the central axis direction of the throttle-side air intake pipe.

10. The air intake apparatus for an internal combustion engine according to 6, wherein the throttle-side air intake pipe includes a first pipe expansion portion provided in a region in a vicinity of the cylindrical portion on an upstream side of the cylindrical portion of the fin component in a central axis direction of the throttle-side air intake pipe, whose flow path sectional area is larger than that of a portion on an upstream side thereof and a second pipe expansion portion provided in a region on a downstream side of the cylindrical portion of the fin component in the central axis direction of the throttle-side air intake pipe, in which the gas distributivity improvement fin is located, whose flow path sectional area is larger than that of the cylindrical portion, and the external gas inlet is provided in the second pipe expansion portion.

11. The air intake apparatus for an internal combustion engine according to claim 1, further comprising: an external gas pipe connected to the external gas inlet, supplying external gas to the external gas inlet, and provided with an offset portion in which a central axis of the external gas inlet and a central axis of the external gas pipe are offset with respect to each other.

12. The air intake apparatus for an internal combustion engine according to claim 11, wherein in a structure provided with the offset portion, an inner diameter of the external gas inlet is larger than an inner diameter of the external gas pipe.

13. The air intake apparatus for an internal combustion engine according to claim 11, wherein the offset portion is formed in a connection between at least one of the throttle-side air intake pipe and the surge tank, which is provided with the external gas inlet, and the external gas pipe.

* * * * *